US008568522B2

(12) United States Patent
Klippel et al.

(10) Patent No.: US 8,568,522 B2
(45) Date of Patent: Oct. 29, 2013

(54) METHOD OF PASSIVATING METALLIC SURFACES BY MEANS OF COPOLYMERS HAVING PHOSPHORIC ACID AND/OR PHOSPHONIC ACID GROUPS

(75) Inventors: Frank Klippel, Ludwigshafen (DE); Alexander Göthlich, Mannheim (DE); Gunnar Schornick, Neuleiningen (DE); Dietrich Fehringer, Dielheim (DE); Thomas Heidenfelder, Dannstadt-Schauernheim (DE); Helmut Witteler, Wachenheim (DE); Walter Bertkau, Ludwigshafen (DE)

(73) Assignee: BASF SE (DE)

( * ) Notice: Subject to any disclaimer, the term of this patent is extended or adjusted under 35 U.S.C. 154(b) by 696 days.

(21) Appl. No.: 12/374,902

(22) PCT Filed: Jul. 18, 2007

(86) PCT No.: PCT/EP2007/057406
§ 371 (c)(1),
(2), (4) Date: Jan. 23, 2009

(87) PCT Pub. No.: WO2008/012248
PCT Pub. Date: Jan. 31, 2008

(65) Prior Publication Data
US 2009/0324839 A1 Dec. 31, 2009

(30) Foreign Application Priority Data

Jul. 25, 2006 (EP) .................... 06117802

(51) Int. Cl.
*C23C 22/06* (2006.01)
*C23C 22/48* (2006.01)

(52) U.S. Cl.
USPC .............. 106/14.41; 106/14.11; 106/14.12; 106/14.42; 148/243; 148/250; 148/251; 148/252; 148/274

(58) Field of Classification Search
USPC ............... 148/275, 243, 250–252, 274; 106/14.11, 14.12, 14.41, 14.42
See application file for complete search history.

(56) References Cited

U.S. PATENT DOCUMENTS

| 6,583,214 | B1 | 6/2003 | Haeberle et al. |
| 6,802,913 | B1 * | 10/2004 | Goodreau et al. ............ 148/251 |
| 7,074,750 | B2 * | 7/2006 | Hamers et al. ................ 510/400 |
| 2005/0163933 | A1 | 7/2005 | Dietsche et al. |
| 2005/0181225 | A1 | 8/2005 | Destarac et al. |
| 2007/0176149 | A1 | 8/2007 | Dietsche et al. |
| 2007/0240792 | A1 | 10/2007 | Witteler et al. |
| 2008/0199714 | A1 | 8/2008 | Witteler et al. |
| 2008/0269446 | A1 | 10/2008 | Michl et al. |

FOREIGN PATENT DOCUMENTS

| DE | 19914896 A1 | 10/2000 |
| DE | 102004041127 A1 | 3/2006 |
| DE | 102005027567 A1 | 12/2006 |
| DE | 102005027568 A1 | 12/2006 |
| EP | 0787830 A2 | 8/1997 |
| EP | 1146144 A1 | 10/2001 |
| GB | 2347678 A | 9/2000 |
| WO | WO-00/55391 A1 | 9/2000 |
| WO | WO-2004/074372 A1 | 9/2004 |
| WO | WO-2006/021308 A1 | 3/2006 |

* cited by examiner

*Primary Examiner* — Lois Zheng
(74) *Attorney, Agent, or Firm* — Novak Druce Connolly Bove + Quigg LLP

(57) ABSTRACT

Process for passivating metallic surfaces, and a preparation suitable for implementing the process, comprising at least water, an acid, and a copolymer of functionalized (meth) acrylic esters, monomers containing phosphoric and/or phosphonic acid groups, monomers having COOH groups, and, if appropriate, further monomers. Copolymer which comprises said monomers.

15 Claims, No Drawings

METHOD OF PASSIVATING METALLIC SURFACES BY MEANS OF COPOLYMERS HAVING PHOSPHORIC ACID AND/OR PHOSPHONIC ACID GROUPS

RELATED APPLICATIONS

This application is a national stage application (under 35 U.S.C. §371) of PCT/EP2007/057406, filed Jul. 18, 2007, which claims benefit of European Application No. 06117802.6, filed Jul. 25, 2006.

The present invention relates to a process for passivating metallic surfaces, to an acidic preparation suitable for implementing the process, said preparation comprising at least water and also a copolymer of functionalized (meth)acrylic esters, monomers containing phosphoric and/or phosphonic acid groups, COOH-containing monomers, and, if appropriate, further monomers, and also to said copolymer.

The raw material used for the production of sheetlike metallic workpieces such as, for example, automotive components, bodywork components, equipment linings, façade claddings, ceiling claddings or window profiles are presently typically long metal strips which are produced by hot rolling and/or cold rolling of metal slabs and which are wound into coils for the purposes of storage and transportation.

The metal strips are divided up and are shaped to form the desired shaped parts by means of suitable techniques such as punching, drilling, folding, conversion into profiles and/or deep drawing. Larger components, such as automobile bodies, for example, are joined, if appropriate, by welding of a plurality of individual parts.

The corrosion protection treatment of metallic materials of this kind is typically accomplished in multistage operations, and the surface of treated metals has a number of different layers A corrosion protection treatment can be performed at various points in the production operation. The corrosion protection involved may be either temporary or permanent. Temporary protection is applied, for example, only for storage or transportation of a metal strip or another metallic workpiece, and is removed again prior to ultimate processing.

Of particular technical and economic importance are strips having a galvanized surface, particularly strips of electrogalvanized or hot dip galvanized iron or steel. The corrosion protection of the zinc derives from the fact that it is less noble than the metallic material itself, and therefore initially corrodes itself. The metallic material per se remains intact as long as it is still continuously covered with zinc. Also of importance are metal strips of aluminum or aluminum alloys. In the presence of atmospheric oxygen, a thin oxide layer forms initially on the surface of Zn or Zn alloys, Al or Al alloys, and, depending on the external conditions, slows down, to a greater or lesser extent, the corrosive attack on the underlying metal.

In order to enhance the protective effect of such an oxide layer, surfaces of Al and Zn are generally subjected to an additional passivating treatment. In the course of such a treatment, some of the metal to be protected dissolves and is incorporated at least partly into a film on the metal surface. This film resembles the oxide film which is present in any case, and in general comprises deliberately introduced phosphate, heavy metals or/and fluorides. It provides greater protection against corrosion than the film which adheres naturally to the zinc, said film being composed predominantly of zinc oxide and zinc carbonate and commonly referred to as a passivation layer. It also frequently improves the adhesion of paint coats applied to the metal. Instead of the term "passivation layer" therefore, the term "conversion layer" is frequently used synonymously, and sometimes the term "pretreatment layer" as well. A passivation layer applied to strip steel immediately after galvanizing is occasionally also referred to as an "aftertreatment layer". Passivation layers are comparatively thin and typically have a thickness of not more than 3 μm.

In general, in order to enhance the corrosion protection, additional (paint) coats are applied to the passivation layer. Generally speaking, these are a combination of two or more paint coats, each serving different purposes. They serve, for example, to protect the passivation layer and the metal from corrosive gases and/or liquids but also from mechanical damage, such as stone chipping, for example, and of course also serve esthetic purposes. Paint coats are typically much thicker than passivation layers. Typical thicknesses range from 4 μm to 400 μm.

In the past, passivation layers on zinc or aluminum surfaces were typically obtained by treating the workpiece to be protected with aqueous, acidic solutions of solutions comprising chromates. More recently, techniques have also been developed in which, instead of the chromates, various polymers are used for passivating, including polymers containing phosphoric and/or phosphonic acid groups.

WO 00/55391 discloses the use of vinylphosphonic acid homopolymers or copolymers in combination with $SiO_2$ for treating metallic surfaces. Comonomers mentioned include, for example, (meth)acrylic acid, maleic acid or vinylsulfonic acid, but not (meth)acrylic esters.

WO 2004/74372 discloses a process for passivating metal surfaces using copolymers of 50% to 99.9% by weight (meth)acrylic acid, 0.1% to 50% by weight other acidic comonomers containing COOH groups and/or 0.1% to 50% by weight comonomers containing phosphoric and/or phosphonic acid groups, and also, if appropriate, 0% to 30% by weight of further monomers.

EP-A 787 830 discloses a chromium-free composition for treating metallic surfaces which comprises a binder comprising OH groups, phosphoric acid, and certain metal ions. Some examples disclose copolymers which comprise, as well as OH-comprising acrylates, simple acrylates, styrene and (meth)acrylic acid, up to 1.7% by weight of phosphonooxyethyl methacrylate.

EP-A 1 146 144 discloses a composition for treating metallic surfaces which comprises Al, Mg and Mn, a water-soluble binder, an acid, and water. One example discloses for this purpose the use of a monomer which comprises 26.7% by weight hydroxybutyl acrylate, 0.8% by weight a phosphorus-containing monomer, and 72.5% by weight simple acrylates and/or styrene.

US 2005/181225 A1 discloses the use of block copolymers for treating metallic surfaces, the block polymers having at least one block comprising phosphoric acid and/or phosphonic acid groups and also at least one different block. The block copolymer in question may for example be one in which a block of vinylphosphonic acid and acrylic acid is joined to a polyacrylamide block or to a butyl acrylate block.

The polymers which are used in a passivating treatment are required to meet exacting demands. They must not only provide effective protection against corrosion but must also have, for example, good film-forming properties and good optical properties, and ought to endow further paint coats with good adhesion.

The optical qualities of polymer-containing passivating layers may be affected in particular by the phenomenon known as "chalking". In this case the layers are no longer completely clear and transparent, but instead feature more or less nontransparent, white marks. Chalking is very undesirable from the users' standpoint, since it is easily confused with formation of white rust and therefore makes quality control more difficult. The desire is therefore for layers which are clear and transparent.

It was an object of the invention to provide an improved process for passivating metallic surfaces. Such a process ought in particular to give passivating layers having good optical qualities, and in particular a low propensity toward chalking.

Found accordingly has been an acidic preparation for passivating metallic surfaces with a pH ≤5, comprising at least water and also 0.1 to 50% by weight, based on the amount of all components of the preparation, of at least one water-soluble or water-dispersible copolymer comprising phosphoric and/or phosphonic acid groups, wherein the copolymer is composed of the following monomeric units:

(A) 5 to 94% by weight of at least one mono(meth)acrylic ester of the general formula $H_2C=CR^1-COOR^2$, $R^1$ being H or methyl and $R^2$ being a radical selected from the following group:
- ($R^{2a}$) radicals of the general formula $-(R^3-O-)_n-R^4$, n being a natural number from 2 to 40, $R^3$ independently at each occurrence being a divalent, linear or branched alkyl radical having 2 to 4 C atoms, and $R^4$ being H or a linear or branched alkyl radical having 1 to 6 C atoms,
- ($R^{2b}$) radicals of the general formula $-R^5-X_m$, $R^5$ being an (m+1)-valent, linear or branched alkyl radical having 1 to 10 C atoms, X being a functional group selected from the group of $-OH$, $-OR^6$, $-NH_2$, $-NHR^6$, $-NR_2^6$, $-N^+HR_2Y^-$ or $-N^+R_3Y^-$, $R^6$ being methyl or ethyl, Y being a monovalent anion, and m being a natural number from 1 to 6, with the proviso that there is not more than one functional group X per C atom in $R^5$,
- ($R^{2c}$) a mono- or oligosaccharide radical, (B) 5 to 94% by weight of at least one monoethylenically unsaturated monomer which comprises phosphoric and/or phosphonic acid groups and/or salts and/or esters thereof (C) 1 to 90% by weight of at least one monoethylenically unsaturated monomer which comprises at least one COOH group and/or salts thereof and (D) 0 to 30% by weight of further ethylenically unsaturated monomers differing from (A) to (C).

In one preferred embodiment, monomer (B) is vinylphosphonic acid.

Also found has been a process for passivating metallic surfaces, especially the surface of strip metals, in which said formulation is employed.

In a third aspect the invention provides the copolymer, as defined above, used for implementing the stated process.

Details of the invention now follow.

The metallic surfaces which can be passivated by means of the process of the invention are, in particular the surfaces of nonnoble metals. The surface in question may for example be that of iron, steel, Zn, Zn alloys, Al or Al alloys, Sn and Sn alloys, Mg or Mg alloys. The steels may be either low-alloy or high-alloy steels.

The process of the invention is especially suitable for passivating metallic surfaces of Zn, Zn alloys, Al or Al alloys. These surfaces may be those of bodies or workpieces composed entirely of said metals or alloys. Alternatively they may be the surfaces of bodies coated with Zn, Zn alloys, Al or Al alloys, it being possible for the bodies to be composed of other materials, such as of other metals, alloys, polymers or composite materials, for example. The surface in question may in particular be that of galvanized iron or steel. The term "galvanized" also of course comprises coating with a zinc alloy, especially hot dip galvanizing with ZnAl alloys and electrolytic galvanizing (electrogalvanizing) with ZnNi, ZnFe, ZnMn and ZnCo alloys.

Zn or Al alloys are known to the skilled worker. The desired end application colors the skilled worker's choice of the type and amount of alloying constituents. Typical constituents of zinc alloys comprise, in particular, Al, Mg, Pb, Si, Mg, Sn, Cu or Cd. Also possible are Al/Zn alloys in which Al and Zn are present in approximately equal amounts. The coatings may be substantially homogeneous coatings or else coatings having concentration gradients. One possible example of this is galvanized steel to which Mg has additionally been applied by vapor deposition. The result may be a Zn/Mg alloy on the surface. Typical constituents of aluminum alloys comprise, in particular, Mg, Mn, Si, Zn, Cr, Zr, Cu or Ti.

In one preferred embodiment of the process the surface in question is that of a strip metal, preferably comprising aluminum or aluminum alloys or iron or steel, especially strips of electrogalvanized or hot dip galvanized steel.

With further preference the surfaces in question are those of shaped bodies which are obtainable from said strip metals by processing procedures such as cuffing, working and/or joining. Examples comprise automobile bodies or parts thereof, truck bodies, paneling for household appliances such as washing machines, dishwashers, washer dryers, gas and electric cookers, microwave ovens, chest freezers or refrigerators, for example, cladding for technical appliances or apparatus such as machines, switch cabinets, computer housings or the like, for example, components in the architectural sector such as wall parts, façade elements, ceiling elements, window profiles or door profiles or partitions, and furniture made of metallic materials, such as metal cabinets or metal shelving.

The metallic surfaces for treatment can of course also have thin oxidic, hydroxidic and/or carbonate surface layers or layers of similar construction. Layers of this kind typically form spontaneously on metallic surfaces in contact with the atmosphere, and are included in the term "metallic surface".

The preparation used for passivating comprises one or more water-soluble or water-dispersible copolymers containing phosphoric and/or phosphonic acid groups.

The term "water-soluble" in the context of this invention is intended to denote the fact that the copolymer or copolymers used are to be homogeneously water-soluble. The term "water-dispersible" means that, although the solution is not completely clear, the polymer is nevertheless homogeneously distributed therein and also does not settle out. For performing the invention it is possible with preference to use copolymers which are water-soluble. The use of aqueous dispersions of crosslinking polymer particles of inherently water-insoluble polymers is not within the scope of this invention.

The copolymers used ought preferably to be continuously miscible with water, although this is not absolutely necessary in every case. They must, however, be water-soluble or water-dispersible at least to a degree such that passivation by means of the process of the invention is possible. As a general rule, the copolymers used ought to have a solubility of at least 50 g/l, preferably 100 g/l, and more preferably at least 200 g/l in water.

The skilled polymer worker is aware that the solubility of polymers containing acid groups in water may be dependent on the pH. The reference point chosen should therefore be in each case the pH that is desired for the particular intended use. A polymer which at one particular pH has a solubility which is not sufficient for the envisaged use may have sufficient solubility at a different pH.

Description of Copolymers Used

The copolymers of the invention are composed of at least one monomer from each of groups (A), (B), and (C). Optionally it is possible for monomers (D) to be present as well. Over and beyond these there are no other monomers present. Preferably there are no monomers (D) present.

Monomers (A)

The monomers (A) comprise at least one functionalized mono(meth)acrylic ester of the general formula $H_2C=CR^1$—$COOR^2$. In this formula $R^1$ is H or methyl. $R^2$ is a radical selected from the group of $R^{2a}$, $R^{2b}$ or $R^{2c}$.

The radicals $R^{2a}$ are radicals of the general formula —$(R^3$—$O$—$)_n$—$R^4$. In this formula n is a natural number from 2 to 40. With preference n is 2 to 20 and with particular preference 2 to 10. The radicals $R^3$ are independently at each occurrence a divalent, linear or branched alkyl radical having 2 to 4 C atoms. Examples comprise, in particular, 1,2-ethylene radicals, 1,2-propylene radicals, 1,2-butylene radicals, and 1,4-butylene radicals. Mixtures of different radicals are of course also possible. Preference is given to 1,2-ethylene and/or 1,2-propylene radicals. With particular preference the radicals are exclusively 1,2-ethylene radicals. Additionally preferred are radicals ($R^{2a}$) which contain both 1,2-ethylene and 1,2-propylene radicals, the quantity of ethylene radicals being at least 50%, preferably at least 70%, and more preferably at least 80%, based on the total number of all radicals $R^3$. $R^4$ is H or a linear or branched alkyl radical having 1 to 6 C atoms. Preferred radicals $R^4$ are H, methyl and ethyl groups. Examples of radicals $R^{2a}$ comprise —$CH_2$—$CH_2$—$O$—$CH_2$—$CH_2$—$O$—$CH_2$—$CH_3$, —$CH_2$—$CH(CH_3)$—$O$—$CH_2$—$CH(CH_3)OH$, —$CH_2$—$CH(CH_3)$—$O$—$CH(CH_3)$—$CH_2OH$, —$CH(CH_3)$—$CH_2$—$O$—$CH(CH_3)$—$CH_2OH$ or —$CH(CH_3)$—$CH_2$—$O$—$CH_2$—$CH(CH_3)OH$.

The radicals $R^{2b}$ are radicals of the general formula —$R^5$—$X_m$. In this formula m is a natural number from 1 to 6, preferably 1 to 4, more preferably 1 to 3, and, for example, 1 or 2. The radical $R^5$ is an (m+1)-valent linear or branched alkyl radical having 2 to 10 C atoms, preferably 2 to 6 C atoms, and more preferably 2 to 4 C atoms.

The alkyl radical is substituted by at least one functional group X, with the proviso that there is not more than one functional group X per C atom in $R^5$. X is at least one functional group selected from the group of —OH, —$OR^6$, —$NH_2$, —$NHR^6$, —$NR^6_2$, —$N^+HR^6_2Y^-$ or —$N^+R^6_3Y^-$. $R^6$ is methyl or ethyl and Y is a monovalent anion. Examples of suitable anions comprise, for example, $HSO_4^-$, $HSO_3^-$ and, in particular, the anions of organic sulfonic acids, such as $CH_3SO_3^-$, $CF_3SO_3^-$ or p-$CH_3(C_6H_4)SO_3^-$, for example, or of organic sulfates, such as $CH_3SO_4^-$ or $CH_3CH_2SO_4^-$, for example. Halide ions are less preferred but can be used in special cases. Examples of radicals $R^{2b}$ with amino and/or ammonium groups comprise —$CH_2$—$CH_2$—$N(CH_3)_2$ and —$CH_2$—$CH_2$—$N^+(CH_3)_3$*$CH_3SO_4^-$.

The functional group X is preferably an OH group. Examples of suitable radicals $R^{2b}$ with OH groups comprise linear radicals of the general formula —$(CH_2)_m$—OH such as —$CH_2$—$CH_2$—OH, —$CH_2$—$CH_2$—$CH_2$—OH, —$CH_2$—$CH_2$—$CH_2$—$CH_2$—OH or —$CH_2$—$CH_2$—$CH_2$—$CH_2$—$CH_2$—$CH_2$—OH.

Particularly preferred radicals $R^{2b}$ for implementing the invention are radicals selected from the group of —$CH_2$—$CH_2$—OH, —$CH_2$—$CH_2$—$CH_2$—OH, —$CH_2$—$CH_2$—$CH_2$—$CH_2$—OH, —$CH_2$—$CH(CH_3)$—OH, —$CH(CH_3)$—$CH_2$—OH or —$CH_2$—$CH(OH)$—$CH_2$—OH.

In a further, preferred embodiment of the invention at least one of the radicals $R^{2b}$ is a branched alkyl radical of the general formula —$R^7$—$CH(R^8)OH$. In this formula $R^7$ and $R^8$ are each a linear or branched alkyl radical having 1 to 8 C atoms, preferably 1 to 6 C atoms, and more preferably 1 to 4 C atoms, with the proviso that the sum of the C atoms in $R^7$ and $R^8$ is not more than 9. With preference $R^7$ and $R^8$ are each linear alkyl groups. With particular preference $R^8$ is a methyl group. The radical in question may for example be —$CH_2$—$CH(CH_3)$—OH. With branched (meth)acrylic esters of this kind, the tendency of the OH group to form further ester bonds with other COOH-containing monomers is significantly reduced. Very particular preference is given to —$CH_2$—$CH(CH_3)$—OH and/or —$CH(CH_3)$—$CH_2$—OH, in particular a mixture of both radicals. (Meth)acrylic esters with radicals of this kind can be obtained with simplicity, by means for example of esterifying (meth)acrylic acid with 1,2-propylene glycol.

The radicals $R^{2c}$ are monosaccharide or oligosaccharide radicals, preferably monosaccharide radicals. The saccharides may in principle be of any kind. It is possible with preference to use radicals derived from pentoses and hexoses, particularly from hexoses. Examples of suitable monosaccharides comprise glucose, mannose, galactose, fructose or ribose. With preference it is possible to use radicals derived from glucose. Saccharide derivatives may also come into consideration, examples being products originating from the reduction or oxidation of the saccharides. Sugar acids are a particular possibility, such as gluconic acid, for example.

It is of course also possible to use mixtures of two or more different monomers (A). The amount of all of the monomers (A) employed is together 5 to 94% by weight, based on the amount of all of the monomers copolymerized into the polymer. With preference the amount is 15 to 80% by weight, more preferably 25 to 75% by weight, with very particular preference 35 to 72% by weight, and, for example, 45 to 70% by weight.

Monomers B

The monomers (B) are monoethylenically unsaturated monomers containing phosphoric and/or phosphonic acid groups. Salts and/or esters thereof are included. Esters are preferably monoesters, i.e., not all of the acidic OH groups of the phosphoric and/or phosphonic acid groups are esterified. With particular preference the monomers (B) are the free acids and/or their salts.

Examples of monomers (B) comprise vinylphosphonic acid, monovinyl phosphate, allylphosphonic acid, monoallyl phosphate, 3-butenylphosphonic acid, mono-3-butenyl phosphate, mono-4-vinyloxybutyl phosphate, phosphonooxyethyl acrylate, phosphonooxyethyl methacrylate, mono-2-hydroxy-3-vinyloxypropyl phosphate, mono-1-phosphonooxymethyl-2-vinyloxyethyl phosphate, mono-3-allyloxy-2-hydroxypropyl phosphate, mono-2-allyloxy-1-phosphonoxymethylethyl phosphate, 2-hydroxy-4-vinyloxymethyl-1,3,2-dioxaphosphole, and 2-hydroxy-4-allyloxymethyl-1,3,2-dioxaphosphole. Preference is given to vinylphosphonic acid, monovinyl phosphate or allylphosphonic acid, particular preference to vinylphosphonic acid.

It is of course also possible to use mixtures of two or more different monomers (B). The amount of all of the monomers (B) employed, together, is 5% to 94% by weight, based on the amount of all of the monomers copolymerized into the polymer. Preferably the amount is 10% to 75%, more preferably 15% to 60%, and very preferably 20% to 45% by weight.

Monomers (C)

The monomers (C) are monoethylenically unsaturated monomers which comprise at least one COOH group. The salts thereof are also included.

Examples of monomers (C) comprise (meth)acrylic acid, crotonic acid, vinylacetic acid, maleic acid, fumaric acid, methylfumaric acid, methylmaleic acid, dimethylmaleic acid, methylenemalonic acid or itaconic acid or else $C_1$ to $C_4$ monoesters of said dicarboxylic acids. Dicarboxylic acids can also be used in the form of their cyclic anhydrides, where the formation of cyclic anhydrides is possible. It is of course also possible to use mixtures of two or more different monomers (C).

In one preferred embodiment of the invention at least one of the monomers (C) is (meth)acrylic acid, and particular preference is given to (meth)acrylic acid exclusively.

The amount of all of the monomers (C) employed, together, is 1% to 90% by weight, based on the amount of all of the monomers copolymerized into the polymer. Preferably the amount is 5% to 70%, more preferably 10% to 55%, and very preferably 10% to 35% by weight.

Monomers (D)

Besides the monomers (A), (B), and (C) it is also possible, optionally, to use further ethylenically unsaturated monomers other than (A) to (C), these further monomers being called monomers (D). The monomers (D) serve for fine-tuning of the properties of the copolymer. It is of course also possible to use two or more different monomers (D). They are selected by the skilled worker in accordance with the desired properties of the copolymer, with the proviso that they must be copolymerizable with the monomers (A), (B), and (C).

Examples of suitable monomers (D) comprise, in particular, alkyl esters of (meth)acrylic acid, such as methyl (meth)acrylate, ethyl (meth)acrylate, butyl (meth)acrylate, 2-ethylhexyl (meth)acrylate. Additionally suitable are vinyl ethers or allyl ethers such as methyl vinyl ether, ethyl vinyl ether, propyl vinyl ether, 2-ethylhexyl vinyl ether, vinyl cyclohexyl ether, vinyl 4-hydroxybutyl ether, decyl vinyl ether, 2-(diethylamino)ethyl vinyl ether, 2-(di-n-butylamino)ethyl vinyl ether or methyl diglycol vinyl ether, and the corresponding allyl compounds. It is likewise possible to employ vinyl esters, such as vinyl acetate or vinyl propionate. Use may also be made of basic comonomers, examples of which are acrylamide and alkyl-substituted acrylamides.

The monomers (D) may also be crosslinking monomers having two or more ethylenically unsaturated groups. Examples comprise di(meth)acrylates such as ethylene glycol di(meth)acrylate, butane-1,4-diol di(meth)acrylate, hexane-1,6-diol di(meth)acrylate, methylenebisacrylamide or di(meth)acrylates of polyethylene glycol, tri(meth)acrylates such as trimethylolpropane tri(meth)acrylate, and oligo (meth)acrylates.

The amount of all optionally employed monomers (D) together is 0% to 30% by weight, based on the total amount of monomers used. With preference the amount is 0% to 20%, more preferably 0% to 10%, by weight. If crosslinking monomers (D) are present, their amount should generally not exceed 5%, preferably 2% by weight based on the total amount of all of the monomers employed for the process. The amount may be, for example, 10 ppm to 1% by weight. With very particular preference there are no monomers (D) present.

Preparation of the Polymers

The preparation of the polymers of the invention may take place on the one hand directly from the monomers (A), (B), (C), and, optionally, (D). In other embodiments of the invention the polymers may also be prepared by polymer-analogous esterification or else by esterifying or hydrolyzing monomers during the polymerization reaction.

Variant A: Direct Preparation from the Monomers

The components (A), (B), (C), and, optionally, (D) can be polymerized with one another in a way which is known in principle. Appropriate polymerization techniques are known to the skilled worker. The copolymers are prepared preferably by free-radical polymerization in a suitable solvent. Details of the conduct of a free-radical polymerization are known to the skilled worker.

The polymerization is performed preferably in aqueous or predominantly aqueous solution. Suitable further solvents besides water include water-miscible organic solvents, especially water-miscible alcohols. The polymerization is preferably performed in water.

The free-radical polymerization is preferably initiated using suitable thermally activable polymerization initiators. Initiators which can be used include, in principle, all compounds which break down into free radicals under the polymerization conditions, with the proviso that they are sufficiently soluble in the reaction medium. Examples of suitable initiators comprise inorganic peroxo compounds, such as peroxodisulfates, especially ammonium, potassium, and, preferably, sodium peroxodisulfate, peroxosulfates, hydroperoxides, percarbonates and hydrogen peroxide, and those known as redox initiators. In certain cases it is advantageous to use mixtures of different initiators, such as mixtures of hydrogen peroxide and sodium or potassium peroxodisulfate. Mixtures of hydrogen peroxide and sodium peroxodisulfate can be used in any desired ratio.

In addition it is possible to use water-soluble azo compounds such as, for example, azobis(2-amidinopropane) dihydrochloride.

Where mixtures with alcohols are used as solvents it is also possible to use peroxo compounds that are soluble in organic solvents, such as t-butyl peroctoate.

Additionally preferred initiators are redox initiators. Redox initiators comprise as their oxidizing component at least one of the aforementioned peroxo compounds and as their reducing component, for example, ascorbic acid, glucose, sorbose, ammonium or alkali metal hydrogen sulfite, sulfite, thiosulfate, hyposulfite, pyrosulfite, sulfide or sodium hydroxymethylsulfoxylate. As a reducing component of the redox catalyst it is preferred to use ascorbic acid or sodium pyrosulfite. Based on the amount of monomers employed in the polymerization, the amount of the reducing component of the redox catalyst that is used is, for example, $1 \times 10^{-5}$ to 1 mol %.

In combination with the initiators or redox initiator systems it is additionally possible to use transition metal catalysts, examples being salts of iron, cobalt, nickel, copper, vanadium, and manganese. Examples of suitable salts include iron(II) sulfate, cobalt(II) chloride, nickel(II) sulfate, copper (I) chloride. The reducing transition metal salt is typically employed in an amount of 0.1 to 1000 ppm, based on the sum of the monomers. Particularly advantageous combinations are those, for example, of hydrogen peroxide with iron(II) salts, such as a combination of 0.5% to 30% by weight hydrogen peroxide and 0.1 to 500 ppm $FeSO_4 \times 7H_2O$, based in each case on the sum of the monomers.

It is of course also possible to use mixtures of different initiators, provided they do not have adverse effects on one another. The amount is determined by the skilled worker in accordance with the copolymer desired. As a general rule, 0.05% to 30%, preferably 0.1% to 15%, and more preferably 0.2% to 8% by weight of the initiator is used, relative to the total amount of all monomers.

In addition it is also possible, in a way which is known in principle, to use suitable regulators, such as mercaptoethanol. Preferably no regulators are used.

Preference is given to using thermal initiators, with water-soluble azo compounds and water-soluble peroxo compounds being preferred. Very particular preference is given to azobis(2-amidinopropane) dihydrochloride, hydrogen peroxide, and sodium peroxodisulfate, or mixtures thereof, in conjunction if appropriate with 0.1 to 500 ppm of $FeSO_4 \times 7H_2O$.

Alternatively, however, the polymerization can also be initiated, for example, by means of suitable radiation. Examples of suitable photoinitiators comprise acetophenone, benzoin ethers, benzyl dialkyl ketones and derivatives thereof.

The free-radical polymerization is performed preferably at a temperature of less than 130° C. Apart from that consideration, the temperature may be varied by the skilled worker within wide limits, depending on the nature of the monomers employed and of the initiator and on the desired copolymer. A minimum temperature of approximately 60° C. has been found appropriate here. The temperature may be kept constant during the polymerization, or else it is possible to run temperature profiles. With preference the polymerization temperature is 70 to 125° C., with particular preference 75 to 100° C.

The polymerization can be performed in customary apparatus for free-radical polymerization. When operating above the boiling temperature of the water or of the mixture of water and further solvents, it is carried out in a suitable pressure vessel; otherwise, atmospheric pressure can be used. The polymerization times are typically 1-10 h, preferably 2-9 h, and in particular 3-8 h.

In the case of polymerization in an aqueous medium it should be noted that the (meth)acrylic esters used as monomers (A) are not entirely stable to hydrolysis in aqueous solution, but instead may undergo hydrolysis to form (meth)acrylic acid and the corresponding alcohol. Conversely, monomers containing COOH groups may also form esters in situ with alcohols in the reaction medium. As a result, further synthesis variants come about for the polymer.

Inventive copolymers comprising (meth)acrylic acid units (C) can therefore also be obtained by carrying out the polymerization using only monomers (A), (B), and, if appropriate, (D) in an aqueous medium, the units (C) being formed in situ by hydrolysis in the course of the polymerization. It is of course also possible, however, for additional (meth)acrylic acid and/or other monomers (C) to be added from the start. This can be advisable if the intention is to incorporate relatively large amounts of the monomer units (C) into the copolymer.

As the skilled worker is aware, acidic ester hydrolysis is a pronounced equilibrium reaction. The degree of hydrolysis can be controlled by the conditions under which the polymerization is performed. The higher the temperature, the longer the reaction time, and the lower the concentration of the monomers and/or copolymers (i.e., the higher the water fraction), the higher the degree of hydrolysis. Methacrylates generally hydrolyze more slowly than acrylates. Furthermore, the hydrolysis can be slowed by partial neutralization of the acidic groups of monomers employed, in other words at least of the acidic groups of the monomers (B) and also of the monomers (C), where such monomers (C) are additionally employed. However, it is not necessary for an equilibrium state to be attained; instead, during the polymerization, it is also possible, depending on the conditions, for no equilibrium state to be attained.

Suitable bases for neutralizing include, in particular, ammonia, amines, amino alcohols or alkali metal hydroxides or soluble basic zinc, magnesium, aluminum or calcium salts, preferably the hydroxides. It is of course also possible to use mixtures of different bases. Preferred amines are alkylamines having up to 24 C atoms and also amino alcohols which have up to 24 C atoms and also structural units of type —N—$C_2H_4$—O— and —N—$C_2H_4$—OH and —N—$C_2H_4$—O—$CH_3$. Examples of amino alcohols of this kind comprise ethanolamine, diethanolamine, triethanolamine, and their methylated derivatives. The bases can be added before or during the polymerization.

By no means, however, should the degree of neutralization be too high; instead, there should still be sufficient free acid groups in the polymer. Free acid groups achieve particularly effective adhesion of the polymers to the metallic surface. As a general rule, not more than 50 mol % of the acid groups present in the copolymer should be neutralized, preferably 5 to 40 mol %, more preferably 15 to 10 mol %.

The synthesized copolymers may be isolated from the aqueous solution by means of typical methods known to the skilled worker, such as by evaporating down the solution, by spray drying, by freeze drying or by precipitation. With preference, however, the copolymers are not isolated at all from the aqueous solution after the polymerization, but instead the resultant copolymer solutions are used as such for the process of the invention.

Variant B: Polymer-analogous Esterification

In an alternative process for preparing the copolymers of the invention the copolymers can be prepared by polymer-analogous esterification.

For this purpose a starting material is prepared which is a polymer made up of (meth)acrylic acid units, the monomers (B), if appropriate, monomers (C) different than (meth)acrylic acid, and, optionally, monomers (D). This can be done by means of the free-radical polymerization techniques outlined above. It is also possible, if appropriate, to use commercially available polymers for this purpose. By way of example, 70.30 acrylic acid-vinylphosphonic acid copolymers are available commercially.

The COOH groups of the (meth)acrylic acid units can be esterified with suitable alcohols in a separate step after the polymerization. As the alcohol for esterifying, alcohols of the general formula HO—$R^2$ are employed, $R^2$ being as defined above. In this case, structural units (A) copolymerized in situ are obtained. Where the copolymer comprises other monomers as well that contain COOH groups, these monomers are of course also esterified accordingly. By way of example mention may be made of maleic acid.

Depending on the nature of the alcohol HO—$R^2$ it is possible to use the alcohol itself as the sole solvent. It is of course also possible to use two or more different alcohols HO—$R^2$ in the mixture. Alternatively the alcohol can be used in a mixture with other solvents, such as for example with water or other polar aprotic solvents, such as ketones, acetone or methyl ethyl ketone for example, or ethers, such as dioxane or tetrahydrofuran. Where water is used in the mixture with alcohols, however, the amount should be extremely small. In general the amount of water should not be more than 60% by weight, relative to the amount of all solvents, preferably not more than 50% by weight, and more preferably not more than 45% by weight.

With preference it is possible to use alcohols of the general formula HO—$R^7$—CH($R^8$)OH, $R^7$ and $R^8$ being as defined above. $R^7$ and $R^8$ here are preferably linear alkyl radicals and with particular preference $R^8$ is —$CH_3$.

An alcohol employed with especial preference is 1,2-propylene glycol, HO—$CH_2$—CH(OH)—$CH_3$. In this case, in the course of the esterification, the primary OH group reacts preferentially, while the reactivity of the secondary OH group is much less. This is an elegant way of avoiding crosslinking of the polymer and formation of an insoluble gel. Moreover, 1,2-propylene glycol functions at the same time as a solvent, and in particular serves as a solubilizer for other alcohols, especially for solid and difficult-to-melt alcohols.

It may, however, be entirely desirable to bring about a low level of crosslinking of the polymer. For this purpose it has been found appropriate to use fractions of alcohols that lead to monomers of type A with $CH_2$—OH side chains. Attention may be drawn here, for example, to mixtures of 1,2-ethylene glycol and 1,2-propylene glycol. The mixing ratio is chosen such that the polymer solution is sufficiently soluble and the solution is sufficiently stable. It is possible, for example, for the ratio to be 30 mol % 1,2-ethylene glycol to 70 mol % 1,2-propylene glycol.

Preferred reaction temperatures for the esterification are 70° C. to 120° C., with particular preference 80° C. to 100° C. Depending on the reaction temperatures, the reaction is carried out under atmospheric or else superatmospheric pressure.

As auxiliaries it is also possible to use typical esterification catalysts. Examples comprise mineral acids, ion exchangers, Lewis acids, metal salts, such as zinc acetate, heterogeneous catalysts, such as silica gels modified with metal ions, amphoteric metal hydroxides, or titanium compounds of type Ti(O-alkyl)$_4$.

The degree of esterification can be controlled in a way which is known in principle, by means of the reaction conditions. The skilled worker is aware that acidic ester formation or ester hydrolysis is a pronounced equilibrium reaction. The degree of esterification depends on the one hand on the position of the chemical equilibrium and also on whether such equilibrium is attained at all during the reaction time. The equilibrium depends on factors including the ratio of alcohol to COOH groups, the water fraction in the reaction mixture, and, if appropriate, the temperature. Reaction temperature, reaction time, and, if appropriate, the presence of a catalyst determine whether the equilibrium is attained at all.

With the present polymer-analogous esterification, the degree of esterification is generally about 5 to 60 mol % with respect to the sum of the COOH groups originally present, provided the water of reaction formed is not removed from the reaction mixture. The degree of esterification is preferably at least 15 mol % and more preferably at least 20 mol %. If a higher degree of esterification is desired, the water formed should be removed from the reaction mixture.

The copolymers obtained can be isolated from the reaction solution as described above. Preferably, however, the copolymers, after the polymerization, are not isolated from the solution at all; instead, the resulting copolymer solutions are used as such for the process of the invention. Unreacted alcohols are generally not disruptive, and may even be beneficial through a plasticizing effect.

Variant C: Esterification in the Course of Polymerization

In a further variant of the preparation process the starting materials used for preparing the copolymers can be (meth) acrylic acid, monomers (B), and, optionally, monomers (C) and/or (D).

With this variant the solvents used for the polymerization are the above-mentioned alcohols HO—$R^2$ and, preferably, the likewise aforementioned alcohols HO—$R^7$—CH($R^8$) OH, or mixtures of these alcohols with water. The monomers can be polymerized with one another using the initiators specified at the outset, with formation of the monomer units (A) in situ in the course of the polymerization. With regard to details, attention is drawn to what was said for synthesis variant B.

Process for Passivating

In order to implement the process of the invention for passivating, an acidic, aqueous preparation of said copolymers of the invention is employed. This may also of course constitute a mixture of two or more different copolymers of said type.

The molecular weight $M_w$ (weight average) of the copolymers used for the process of the invention is specified by the skilled worker in accordance with the desired application. Use may be made, for example, of polymers having a molecular weight $M_w$ of 3000 to 1 000 000 g/mol. Polymers which have been found particularly appropriate are those with 5000 g/mol to 500 000 g/mol, preferably 10 000 g/mol to 250 000 g/mol, more preferably 15 000 g/mol to 100 000 g/mol, and very preferably 20 000 to 75 000 g/mol.

As solvent the preparation comprises preferably water. It may in addition comprise water-miscible organic solvents as well. Examples comprise monoalcohols such as methanol, ethanol or propanol, higher alcohols such as ethylene glycol or polyether polyols and ether alcohols such as butyl glycol or methoxypropanol, and N-methylpyrrolidone. In addition it is possible in particular for alcohols of the general formula HO—$R^2$ to be present. These may form, for example, by hydrolysis of (meth)acrylic esters (A), or else may represent radicals which have not been converted—in the course of the polymer-analogous esterification. In general the amount of water, however, is at least 65% by weight preferably at least 75% by weight, and very preferably at least 85% by weight. These figures are based in each case on the total amount of all solvents.

Advantageously it is possible to use the polymer-containing solutions directly that result from the polymerization and/or from the polymer-analogous esterification, though if appropriate they may also be diluted further prior to use.

The concentration of the inventively used copolymers in the preparation is 0.1% to 50% by weight, based on the amount of all of the components of the formulation. Preferably the amount is 1% to 40% and more preferably 5% to 35% by weight. Through the concentration and the nature of the polymers employed it is possible to influence the properties of the preparation, such as its viscosity or its pH, for example. The properties of the preparation can thus be tailored to a particular process technique for the treatment. For example, in the case of a squeegee technique, a concentration of 10% to 25% by weight has been found useful, or in the case of application by means of coating rolls a concentration of 15% to 25% by weight. The stated concentrations are based on the ready-to-use preparation. It is also possible first to prepare a concentrate, which only on site is diluted with water or, optionally, other solvent mixtures to the desired concentration.

The acidic preparation used in accordance with the invention has a pH of not more than 5, in particular a pH of 0.5 to 5, preferably 0.75 to 3.5, and with particular preference 0.8 to 2.0. The pH of the preparation can be controlled, for example, through the nature and concentration of the polymers used in accordance with the invention. Of course, a decisive role is played here by the degree of neutralization of the polymer.

The inventively used preparation may optionally further comprise at least one organic or inorganic acid or mixtures thereof. There is no limit on the selection of such acids, provided that no adverse effects occur together with the other components of the formulation. The skilled worker makes an appropriate selection.

Examples of suitable acids comprise phosphoric acid, phosphonic acid or organic phosphonic acids such as 1-hydroxyethane-1,1-diphosphonic acid (HEDP), 2-phosphonobutane-1,2,4-tricarboxylic acid (PBTC), aminotri(methylenephosphonic acid) (ATMP), ethylenediaminetetra (methylenephosphonic acid) (EDTMP) or diethylenetriaminepenta(methylenephosphonic acid) (DTPMP), N-2-(hydroxyethyl)iminobis(methylphosphonic acid) (HEIBPS), sulfonic acids such as methanesulfonic acid, amidosulfonic acid, p-toluenesulfonic acid, m-nitrobenzenesulfonic acid, and derivatives thereof nitric acid, formic acid or acetic acid. Preference is given to phosphorus-containing acids such as $H_3PO_4$, phosphonic acid, the stated organic phosphonic acids, $HNO_3$ and/or methanesulfonic acid, and $H_3PO_4$ is particularly preferred. With very particular preference the formulation comprises exclusively $H_3PO_4$ as the acid.

In acidic, aqueous solution the (meth)acrylic ester units (A) of the inventively used copolymer may under certain circumstances undergo slow hydrolysis, depending on the nature of the ester group, even at room temperature. At the same time, OH groups of the radicals $R^2$ may also, under certain circumstances, react with free COOH groups to form crosslinking sites. This may lead to unwanted gelling of the preparation. It may therefore be advisable to carry out partial neutralization of the polymers after the reaction, using suitable bases, such as with triethanolamine, and not to add the desired acid until immediately prior to application. The pH value of such formulations may be significantly higher and may amount for example to 3 to 6.

This unwanted crosslinking reaction may also largely be avoided through the use of monomers containing sterically hindered radicals —$R^7$—$CH(R^8)OH$.

Beyond the components stated, the preparation may optionally also comprise further components.

The preparation may optionally comprise at least one dissolved metal ion or dissolved metal compound. In this case the species in question may represent, for example, a metal compound of Al, Mg, Ca, Ni, Co, V, Fe, Zn, Zr, Mn, Mo, W, Ti, Zr. The compounds can be used for example in the form of their respective aqua complexes. Alternatively the species in question may be complexes with other ligands, such as fluoride complexes of Ti(IV), Zr(IV), or oxometallates such as $MoO_4^{2-}$ or $WO_4^{2-}$, for example, or the compounds may also be used in the form of complexes with typical chelate-forming ligands such as ethylenediaminetetraacetic acid (EDTA), diethylenetriaminepentaacetic acid (DTPA), hydroxyethylethylenediaminetriacetic acid (HEDTA), nitrilotriacetic acid (NTA) or methylglycinediacetic acid (MGDA). In addition it is of course possible for complex bonds to the carboxyl groups or to other acidic groups of the copolymer employed to be present. Preferred preparations do not comprise any chromium compounds. Furthermore, there ought preferably to be no metal fluorides or complex metal fluorides present. The passivation of the invention is therefore preferably a chromium-free passivation, more preferably a chromium-free and fluoride-free passivation.

In one preferred embodiment of the invention the preparation comprises at least one soluble metal ion selected from the group of $Zn^{2+}$, $Mg^{2+}$, $Ca^{2+}$ or $Al^{3+}$. The ions may be in the form of hydrated metal ions, or alternatively in the form of dissolved compounds, such as complex compounds with the complexing agents mentioned above, for example. In particular the ions may have complex bonds to the acidic groups of the polymer. Preference is given to $Zn^{2+}$ or $Mg^{2+}$ and very particular preference to $Mg^{2+}$. Besides these the preparation preferably comprises no other metal ions.

The amount of metal ions from the group of $Zn^{2+}$, $Mg^{2+}$, $Ca^{2+}$ or $Al^{3+}$ is determined by the skilled worker in accordance with the desired properties of the preparation. It amounts in general to 0.01% to 20%, preferably 0.1% to 15%, more preferably 0.5% to 10%, and very preferably 1% to 5%, by weight, based in each case on the total amount of all inventively used copolymers in the formulation.

The formulation may further comprise at least one dissolved phosphate ion. It comprises preferably phosphate ions if there are also metal ions present from the group of $Zn^{2+}$, $Mg^{2+}$ or $Ca^{2+}$. The phosphate ions in question may be any kinds of phosphate ions. For example, the ions may be the orthophosphates or diphosphates. For the skilled worker it is clear that in aqueous solution, depending on pH and concentration, there may be an equilibrium between the various dissociation states of the ions.

The amount of phosphate ions in the formulation is laid down by the skilled worker in accordance with the desired properties of the formulation. In general it amounts to 0.01% to 20%, preferably 0.5% to 20%, more preferably 1% to 20%, and very preferably 5% to 20%, by weight, calculated in each case as orthophosphoric acid and based in each case on the copolymers.

The metal ions, especially the metal ions from the group of $Al^{3+}$, $Zn^{2+}$, $Mg^{2+}$ or $Ca^{2+}$, and the phosphate ions, may be used with preference in the form of soluble salts comprising both ions. Examples of such compounds comprise $Zn_3(PO_4)_2$, $ZnH_2PO_4$, $Mg_3(PO_4)_2$ or $Ca(H_2PO_4)_2$, and corresponding hydrates thereof.

Alternatively the ions may be added separately from one another. By way of example it is possible to use the metal ions in the form of the corresponding nitrates, and the phosphate ions can be incorporated into the preparation in the form of phosphoric acid. It is also possible to use insoluble or sparingly soluble compounds such as the corresponding carbonates, oxides, hydrated oxides or hydroxides, for example, which are dissolved under the influence of acid. In the case of a continuous coating operation the excess passivating solution is generally recycled. In this recycling operation it is also possible for metal ions to be introduced by partial dissolution of the shaped article that is to be coated.

Optionally the preparation may further comprise at least one wax dispersed in the formulation. It is of course also possible to use mixtures of different waxes. The term "wax" here comprises both the actual wax and assistance used if appropriate to form a wax dispersion. Waxes for use in aqueous dispersions are known to the skilled worker, who makes an appropriate selection. The waxes may be, for example, montane waxes, polyethylene waxes, waxes based on oxidized polyethylene, on fluorinated polyethylene such as PTFE or other C-, H-, and F-based polymers. The term "polyethylene" is also intended to comprise copolymers of ethylene and other monomers, especially other olefins such as propylene, for example. Ethylene copolymers of this kind preferably comprise at least 65% by weight of ethylene. Through the addition of waxes it is possible to achieve an advantageous reduction in the friction between the surface and the surface of the tools used for working.

The amount of optionally employed waxes is determined by the skilled worker in accordance with the desired properties of the passivating layer. In general an amount of 0.01% to 70% by weight has been found useful, preferably 0.5% to 25%, and more preferably 0.5% to 10% by weight, based in each case on the copolymers used in accordance with the invention.

Beyond the stated metal ions, phosphates, and waxes, the preparation employed may also comprise further components as well. Examples that may be mentioned include surface-active compounds, corrosion inhibitors, complexing agents, oxidizing agents, typical galvanizing assistants, or else further polymers, which are to be distinguished from the inventively used copolymers. Further possible additives are typical coating additives, of the kind described in H. Kittel (ed.) *Lehrbuch der Lacke und Beschichtungen, volume 5—Pigmente, Füllstoffe und Farbmetrik*—2nd ed. S. Hirzel-Verlag, Stuttgart 2003.

From further optional components of this kind, the skilled worker makes an appropriate selection, not least in respect of their amounts, in accordance with the desired application. As a general rule, however, the amount of optional components of this kind should not amount to more than 20%, preferably not more than 10%, and more preferably not more than 5% by weight, based on the copolymers.

The preparations to be used for the method of the invention can be obtained by simple mixing of the components. If waxes are used, they are preferably first dispersed separately in water and mixed as a dispersion with the other components. Wax dispersions of this kind are also available commercially.

For the passivation of metallic surfaces, the surface of the metal is contacted with the preparation, by means of spraying, dipping or rolling on, for example. For this purpose, preferably, only the acidic formulation of the invention is employed. It is also possible, however, to mix the acidic formulation of the invention with other formulations, miscible with the formulation of the invention, for the purpose of passivation, and to use such a mixture, provided that no adverse effects occur.

With regard to the process technique for carrying out the passivation there exists a series of possibilities. These possibilities are guided by factors which include the shape of the workpiece—for example, whether an unshaped, flat metal strip or a metal sheet or a shaped body having, for example, curved surfaces or edges is being used. The treatment may also comprise a plurality of individual process steps. The processes in question may be continuous or batch processes. The skilled person makes a suitable selection from among the possible processes.

The treatment may be carried out, for example, by immersion in the preparation or by spraying or coating with the preparation. On metal strips and metal sheets, the preparation can be preferably rolled on. Furthermore, the metal strip can also be passed through a tank or a spray apparatus with the preparation. Excess passivating solution can be removed by squeeze rolls and recycled to the spray apparatus. The spray apparatus may produce a continuous spray mist, or the preparation may simply be applied in the form of drops to the strip. Irrigation bars, for example, which are composed of a tube in which apertures are made at a distance of 2 to 10 cm from one another are typical, the preparation being squirted onto the strip through the apertures. The flow of the preparation and the subsequent squeegeeing then lead to a sufficient distribution of the product. Additional nozzles operated with compressed air may ensure uniform distribution of the preparation in the edge region of the strip. A continuous process for producing steel strips may also comprise a galvanizing station, followed by an apparatus for passivation with the preparation.

In the case of roller application, the coating material is generally picked up from a trough by a pickup roll and then transferred to an applicator roll. The applicator roll transfers the coating material onto the strip. Pickup roll and applicator roll may be coupled via a roll located in between via which the coating material is transferred. The rolls may rotate in the same direction or in the opposite direction and may run with or against the strip direction. The coating outcome may additionally be determined through the choice of the contact pressure of the roll on the strip and through the roughness and hardness of the roll.

After an immersion operation or spraying operation, excess treatment solution can be removed from the workpiece by allowing the latter to drip dry; in the case of metal sheets, metal foils or the like, however, excess treatment solution can also be removed by means of a squeegee or doctor blade, for example. Another possibility is to rinse the surface after treatment with a cleaning fluid, in particular with water, in order to remove residues of the preparation employed from the surface.

In one alternative embodiment the treatment may also comprise a "no-rinse" operation, in which the treatment solution is dried directly in a drying oven immediately after application, without any rinsing off.

The treatment with the preparation may take place at room temperature or else at elevated temperatures. In general the treatment takes place at 20 to 90° C., preferably 25 to 80° C., and more preferably 30 to 60° C. For this purpose it is possible for example to heat a bath containing the preparation, although an elevated temperature may also come about automatically by the immersion of hot metal into a bath.

The treatment duration is specified by the skilled worker in accordance with the desired properties of the layer, the composition used for the treatment, and the general technical conditions. It may be much less than one second or may be several minutes. In the case of the continuous process, it has proven particularly useful to contact the surface with the preparation for a duration of 1 to 60 s.

After the treatment the solvent used, in other words generally the water, is removed. Its removal may take place at room temperature by means of simple evaporation in air at room temperature.

Alternatively the removal of the solvent may be assisted by suitable auxiliary means, such as by heating and/or by passing gas streams, especially air streams, over the material. The evaporation of the solvent can be assisted, for example, by means of IR lamps or inductive heating, or else, for example, by drying in a drying tunnel. For drying, a temperature of 30° C. to 210° C. has proven useful, preferably 40° C. to 120° C. and more preferably 40° C. to 80° C. The temperature referred to here is the peak temperature found on the metal (peak metal temperature (PMT)), which can be measured by methods familiar to the skilled worker (by way of example, contactless infrared measurement or determination of the temperature with adhered test strips). The drier temperature must, if appropriate, be set higher and is chosen accordingly by the skilled worker.

The process of the invention may optionally also comprise one or more pretreatment steps. For example, the metallic surface can be cleaned prior to passivation with the inventively used preparation, in order to remove greases or oils, for example. Furthermore, it can also be pickled prior to passivation, in order to remove oxidic deposits, scale, temporary corrosion protection, and the like. Furthermore, the surface must also be rinsed, if appropriate, with water after and between such pretreatment steps, and to remove the residues of wash solutions or pickling solutions.

The passivating layer of the invention may be a crosslinked layer. Crosslinking may be achieved in particular by choosing (meth)acrylic esters with radicals $R^2$ of a kind which still possess a functional group that is reactive with COOH groups. Mention may be made here in particular of radical $R^2$ with OH groups, especially radicals with primary OH groups. Examples of monomers of this kind comprise 2-hydroxyethyl (meth)acrylate, 3-hydroxypropyl (meth)acrylate or 4-hydroxybutyl (meth)acrylate. Additionally suitable for crosslinking are also the radicals $R^{2c}$, such as glucose radicals, for example. The OH groups of these monomers are able to react well with COOH groups, in particular at relatively high temperatures. The achievable degree of crosslinking naturally depends also on the ratio in which OH groups and COOH groups are present in the inventively used copolymer.

Of course a crosslinked passivating layer can also be obtained by admixing a crosslinker additionally into the preparation of the invention. For this purpose it is preferred to use crosslinkers whose crosslinking mechanism is triggered only by an external impulse (e.g., temperature increase, photochemical irradiation).

It is also possible, however, to use more reactive crosslinkers. To avoid premature reaction, for example, crosslinkers of this kind can be added to the formulation not until shortly before its application to the metallic workpiece. Alternatively the metal can be first treated with a preparation without crosslinker, after which the applied layer can be treated with a suitable crosslinker, such as being sprayed with the solution of a crosslinker, for example. The converse procedure is also conceivable.

Crosslinking may take place, for example, by addition of a difunctional or polyfunctional reaction partner which is able to form bonds with functional groups of the monomer A-D. Examples of possible, suitable reactions for crosslinking, or crosslinking mechanisms, are as follows:
a) covalent crosslinking: e.g., esterifications, etherifications, reactions of epoxides or aziranes with nucleophiles, amidations, acetalization, urethane formation;
b) ionic crosslinking, formation of polyelectrolytic complexes;
c) formation of hydrogen bonds, Van-der-Waals' bonds; or The crosslinking may also take place by interloping of the polymer chains (e.g., by photochemically induced crosslinking of added photosensitive components).

Examples of suitable crosslinkers comprise difunctional or polyfunctional alcohols, amines, carboxylic acids, aldehydes, thiols, isocyanates, isocyanurates, blocked isocyantates, melamine-formaldehyde condensates, epoxides, carbodiimides or aziranes. The crosslinkers in question may also be low molecular mass crosslinkers, oligomeric crosslinkers or polymeric crosslinkers.

Where crosslinkers are used as part of the formulation they ought preferably to be water-soluble or water-dispersible, but must at least be soluble or dispersible in the inventive formulation. Crosslinkers which are used separately from the acidic formulation in the two-stage operation described above need not necessarily be water-soluble or water-dispersible.

Examples of suitable crosslinkers comprise water-soluble dicarboxylic or polycarboxylic acids, such as oxalic, malonic, maleic, itaconic, citraconic, mesaconic, succinic, glutaric, adipic, sebacic, suberic and citric acid, and polyhydroxydicarboxylic acids of the sugar acid type, for example. Further examples comprise hydroxycarboxylic acids, such as lactic acid, malic acid, tartronic acid, tartaric acid, mandelic acid, citric acid, and one acids of the monosaccharides, for example. Gluconic acid may be mentioned here by way of example.

It is additionally possible to perform crosslinking by addition of di-, tri- or oligo-alcohols. For this purpose it is possible with preference to use substances which possess at least two structural elements of type —CH$_2$OH in the molecule. Examples comprise ethylene 1,2-glycol, propylene 1,3-glycol, 1,4-butanediol, 1,5-pentanediol, 1,6-hexanediol, neopentyl glycol, glycerol, pentaerythritol, diethylene glycol, triethylene glycol and polyethylene glycol.

Examples of crosslinkers based on epoxides comprise low molecular mass compounds having two epoxy groups such as ethylene glycol diglycidyl ether, butanediol diglycidyl ether, hexanediol diglycidyl ether, sorbitol polyglycidyl ether, ethylene or polyethylene glycol diglycidyl ethers, polypropylene oxide glycol diglycidyl ethers, glycerol polyglycidyl ethers, polyglycerol glycidyl ethers, phthalic acid diglycidyl ether or cycloaliphatic compounds such as 3,4-epoxicyclohexanemethyl 3',4'-epoxycyclohexyl carboxylate.

In addition it is also possible to use the water-soluble azirane and oxirane crosslinkers WO 2005/42801 discloses.

Examples of suitable melamine derivatives comprise, for example, hexamethylolmelamine or hexamethoxymethylmelamine or else amino resins which if appropriate have been modified. Crosslinkers comprising melamine-formaldehyde groups are also available commercially, examples being the Luwipal® products (BASF AG).

Isocyanate crosslinkers can be used with preference in the two-stage crosslinking procedure described above. Crosslinkers containing isocyanate groups may be the polyisocyanates typically used in polyurethane chemistry, examples being aliphatic, aromatic, and cycloaliphatic di- and polyisocyantes, the aliphatic hydrocarbon radicals having for example 4 to 12 carbon atoms, the cycloaliphatic or aromatic hydrocarbon radicals for example 6 to 15 carbon atoms, or the araliphatic hydrocarbon radicals for example 7 to 15 carbon atoms, with an NCO functionality of at least 1.8, preferably 1.8 to 5, and more preferably 2 to 4, and also, in particular, their isocyanurates, biurets, allophanates and uretdiones, oxadiazinetriones, iminooxadiazinediones, uretonimine-modified polyisocyanates. The diisocyanates are preferably isocyanates having 4 to 20 C atoms. Examples of typical diisocyanates are aliphatic diisocyanates such as tetramethylene diisocyanate, hexamethylene diisocyanate (1,6-diisocyanatohexane), octamethylene diisocyanate, decamethylene diisocyanate, dodecamethylene diisocyanate, tetradecamethylene diisocyanate, esters of lysine diisocyanates, tetramethylxylylene diisocyanate, trimethylhexane diisocyanate or tetramethylhexane diisocyanate, cycloaliphatic diisocyanates such as 1,4-, 1,3- or 1,2-diisocyanatocyclohexane, the trans/trans, the cis/cis and the cis/trans isomers of 4,4'- or 2,4'-di(isocyanatocyclohexyl)methane, 1-isocyanato-3,3,5-trimethyl-5-(isocyanatomethyl)cyclohexane (isophorone diisocyanate), 2,2-bis-(4-isocyanatocyclohexyl) propane, 1,3- or 1,4-bis(isocyanatomethyl)cyclohexane or 2,4-, or 2,6-diisocyanato-1-methylcyclohexane, and also aromatic diisocyanates such as 2,4- or 2,6-toluoylene diisocyanate and the isomer mixtures thereof, m- or p-xylylene diisocyanate, 2,4'- or 4,4'-diisocyanatodiphenylmethane and the isomer mixtures thereof, 1,3- or 1,4-phenylene diisocyanate, 1-chloro-2,4-phenylene diisocyanate, 1,5-naphthylene diisocyanate, diphenylene 4,4'-diisocyanate, 4,4'-diisocyanato-3,3'-dimethylbiphenyl, 3-methyldiphenylmethane 4,4'-diisocyanate, 1,4-diisocyanatobenzene or diphenyl ether 4,4'-diisocyanate. Crosslinkers comprising isocyanate groups are available commercially, under the brand name Basonat®, for example (BASF AG).

With preference it is also possible to use blocked polyisocyanates as crosslinkers. In the case of blocking, the isocyanate group is reacted reversibly with a blocking agent. On heating to higher temperatures, the blocking agent is eliminated again. Examples of suitable blocking agents are disclosed in DE-A 199 14 896, column 12, line 13 to column 13, line 2. Particular preference is given to using polyisocyanates blocked with ε-caprolactam.

The amount of crosslinker added optionally is generally not more than 20 mol %, preferably not more than 15 mol %, and more preferably not more than 10 mol %, based in each case on the monomer A.

The crosslinking may be performed with preference with an accompanying increase in temperature. Crosslinking can preferably be undertaken in combination with the drying of the layer. In the case of crosslinkers whose action is based on the formation of ester bonds, the degree of crosslinking is determined by the parameters of temperature, crosslinker concentration, water content, and esterification catalyst. The skilled worker selects the parameters so as to result in the desired degree of crosslinking.

If the passivating layer is overcoated, then it is also possible to utilize a baking step for the coating layer to effect simultaneous crosslinking of the underlying passivation layer.

By means of the process of the invention a passivating layer or conversion coat is obtainable, particularly on a metallic surface comprising Zn, Zn alloys, Al or Al alloys. In the course of surface treatment part of the metal to be protected is dissolved, and is immediately reincorporated into an oxidic film on the metal surface. Through the inventive use of the copolymers, this superficial dissolution goes particularly well, and excellent corrosion control is obtained. The precise structure and composition of the passivating layer are unknown to us. However, as well as the typical amorphous oxides of aluminum or of zinc and also, if appropriate, of further metals, the layer comprises the reaction products of the polymer and also, if appropriate, of the crosslinker and/or of further components of the formulation. The composition of the passivating layer is generally not homogeneous; rather, the components appear to exhibit concentration gradients.

The thickness of the passivating layer is set by the skilled worker in accordance with the desired properties of the layer. In general the thickness is 0.01 to 3 µm, preferably 0.1 to 2.5 µm, and more preferably 0.2 to 1.5 µm.

The thickness can be influenced by way, for example, of the nature and amount of the components applied, and also by way of the exposure time. In addition, it is possible to use technical parameters of the process to influence the thickness: by using rollers or squeegees to remove treatment solution applied in excess, for example.

The thickness of the layer is determined by differential weighing before and after exposure of the metal surface to the inventively employed composition, on the assumption that the layer has a specific density of 1 kg/l. In the text below, "layer thickness" always refers to a variable determined in this way, irrespective of the actual specific density of the layer. These thin layers are enough to achieve outstanding corrosion control. Thin layers of this kind ensure that the dimensions of the passivated workpieces are maintained.

The present specification further provides a metallic surface which comprises the passivating layer of the invention. The passivating layer is applied directly on the actual metal surface. In one preferred embodiment the metal surface in question is that of a strip metal of steel which comprises a coating of Zn or a Zn alloy, and on which a passivating layer of the invention has been applied. The surface in question may also be that of an automobile body which has been coated with the passivating layer of the invention.

The metallic surface with its passivating layer can in one preferred embodiment of the invention be overcoated, in a way which is known in principle, with one or more color or effect paint layers. Typical paints, their composition, and typical layer sequences in the case of two or more paint layers are known in principle to the skilled worker. It is found here that the inventive passivation improves the paint adhesion and generates a protection against subfilm corrosion.

The passivation process of the invention can be used at various processing stages. It can be undertaken, for example, at the premises of a steelmaker. In that case a steel strip can be galvanized in a continuous process and immediately after having been galvanized can be passivated by treatment with the formulation used in accordance with the invention. Passivation at this stage is frequently referred to by the skilled worker as "aftertreatment".

The passivation in question may be only temporary, serving to protect against corrosion in the course of storage and transport and/or during further process steps, but removed again before the permanent corrosion protection is applied. The copolymers can be removed from the surface again by cleaning with aqueous alkaline solutions.

Alternatively the treatment may be a permanent corrosion control treatment, which remains on the strip or on the fully formed workpiece and is provided with additional paint coats. Passivation at this stage is also frequently referred to by the skilled worker as "pretreatment".

The examples which follow are intended to illustrate the invention in more detail:

General Remarks:

The stated reaction temperatures refer to the internal temperature within the reaction vessel.

The K values were measured by the method of H. Fikentscher, Cellulose-Chemie, vol. 13, pp. 58-64 and 71-74 (1932) in 1% strength by weight aqueous solution at 25° C. without pH correction.

The solids contents were determined by two-hour heating in a vacuum drying oven at 120° C. with differential weighing.

The residue vinylphosphonic acid monomer content was determined by means of $^{31}P$ NMR spectra.

The degree of esterification of the COOH groups was determined by $^{1}H$ NMR spectra immediately after synthesis. Where various monomers A or various alcohols are used, the statement of the degree of esterification relates to the individual components A" or to the corresponding alcohols, respectively.

The $M_w$ values are determined by means of gel permeation chromatography (GPC). The GPC is calibrated using a broad-distribution Na PAA mixture whose integral molecular weight distribution curve is determined by combined SEC/laser light scattering, in accordance with the calibration method of M. J. R. Cantow et al. (J. Polym. Sci., A-1, 5 (1967) 1391-1394), albeit without the correction for concentration that is proposed therein.

Abbreviations Used:

AS or AA acrylic acid
BDMA 1,4-butanediol monoacrylate
CS citric acid
DMAEA dimethylaminoethyl acrylate
DMAEMA dimethylaminoethyl methacrylate methyl sulfate
DMEA N,N-dimethylethanolamine
DPG dipropylene glycol
EDGA ethyl diglycol monoacrylate
EG 1,2-ethylene glycol
Glu glucose
H2O2 hydrogen peroxide
HDDA 1,6-hexanediol diacrylate
HEA hydroxyethyl acrylate
HEMA hydroxyethyl methacrylate
HEMA-P ethylene glycol methacrylate phosphate HPA hydroxypropyl acrylate
IS itaconic acid
MA methyl acrylate
MBA methylenebisacrylamide
MPEG1000MA methyl-PEG-1000-methacrylate
MaA maleic acid
NaPA Sodium peroxodisulfate
PEGDA PEG-400-diacrylate
PG 1,2-propylene glycol
tBPO tert-butyl peroctoate
TEA triethanolamine
TPG triproylene glycol
V50 Azo V50 (Wako)
VPA vinylphosphonic acid
Part A: Preparation of Inventive Copolymers
General Working Procedure 1:
Synthesis of Inventive Copolymers from Mono(Meth) Acrylic Esters and Vinylphosphonic Acid A 2 l stirred pot with anchor stirrer and internal thermometer is charged with the appropriate amount of the monomer B (monomers containing phosphoric or phosphonic acid groups) in the form of an aqueous solution (40-95% strength) and this initial charge is rendered inert with nitrogen and heated to reaction temperature. Over 3 to 5 hours a feed stream 1 of an aqueous solution of the particular desired monomer A (mono(meth)acrylic ester (100% to 50% strength solution)) and, simultaneously, over 4 to 6 hours, a feed stream of an aqueous initiator solution (5% to 30% strength) are run in. The batch is subsequently stirred at reaction temperature for 2 hours. If appropriate, dilution is carried out with water.

Where monomers of low water-solubility are used, a third feed stream is employed. For this purpose the monomer is not further diluted. Where bases are used, they are charged to the reaction vessel with the vinylphosphonic acid prior to the polymerization.

The monomer units (C) form as a result of hydrolysis from the monomer units (A). Where additional amounts of the monomers (C) are added, they can be run in together with the monomers (A), provided they are homogeneously miscible with the monomers (A). If the two monomers are not compatibly miscible with one another, they are each run in via a separate feed stream.

In one variant of the procedure it is also possible to include minor amounts of the monomer (A) and also of the initiator in the initial charge and to run in the remainder of the monomers as described.

The particular starting materials used, the precise experimental parameters, the degree of esterification, and the further results are compiled in table 1. The K values were measured by the method of H. Fikentscher, Cellulose-Chemie, vol. 13, pp. 58-64 and 71-74 (1932) in 1% strength by weight aqueous solution at 25° C. and at a pH of 7.

Table 1a shows the relation between the degree of esterification in mol % and the composition of the polymer in % by weight.

General Working Procedure 2:
Polymer-analogous Esterification

Starting material used for the synthesis were the polymers of vinylphosphonic acid and also acrylic and/or maleic acid that are listed in table 3. The preparation of such polymers is disclosed for example in WO 2004/074372. Acrylic acid-VPA copolymers are available commercially.

In a 2 l stirred pot with anchor stirrer and internal thermometer, 469.4 g of the respective polymer are mixed with 128.6 g of 1,2-propylene glycol and the mixture is heated at 100° C. with stirring for 8 h.

The starting material is used in each case, the precise experimental parameters, and the results are compiled in table 2. Table 3a shows the relationship between the degree of esterification in mol % and the composition of the polymer in % by weight.

General Working Procedure 3:
Esterification During the Polymerization

A 2 l stirred pot with anchor stirrer and internal thermometer is charged with 226.5 g of vinylphosphonic acid (95% strength) and 353.6 g of 1,2-propylene glycol (100 mol % based on COOH) and this initial charge is rendered inert with nitrogen and heated to 100° C. 0.55 g of iron(II) sulfate heptahydrate in 10 g of deionized water are added. Thereafter a feed stream 1 of 334.9 g of acrylic acid in 205.6 g of deionized water is metered in over 4 hours, and at the same time a feed stream 2 of 91.7 g of hydrogen peroxide (30% strength) is metered in over 5 hours. Subsequently, the mixture is stirred at reaction temperature for two hours. If appropriate, dilution is carried out with water.

It is also possible to use other alcohols and/or monomers, and different amounts. The particular starting materials used, the precise experimental parameters, and the results are compiled in table 3. Table 3a shows the relationship between the degree of esterification in mol % and the composition of the polymer in % by weight.

Where itaconic acid or maleic acid (or anhydride) is used as a comonomer, these monomers are added to the initial charge. Where acrylates are used as comonomers, they are metered into the reaction mixture simultaneously with the acrylic acid.

TABLE 1

Synthesis of inventive copolymers from the monomers in accordance with general working procedure 1:

| Polymer No. | Monomers employed and their amounts [% by weight] | | Amount of Initiator[1] [% by weight] | T [° C.] | Amount of base[2] [mol %] based on VPA | Solids content after polymerization [% by weight] | K value [1% strength] | Degree of esterification [mol %][3] | Residual VPA[2] [mol %] | Remarks |
|---|---|---|---|---|---|---|---|---|---|---|
| 1 | BDMA/VPA | 75/25 | 6% NaPS | 100 | 0 | 19.0 | 47.4 | >50 | 2.6 | |
| 2 | BDMA/VPA | 75/25 | 6% V50 | 80 | 0 | 31.0 | 18.4 | >80 | 3.6 | |
| 3 | DMAEA/VPA | 75/25 | 6% V50 | 80 | 0 | 49.0 | 25 | n.d. | <1 | |
| 4 | DMAEMA/VPA | 92/8 | 6% NaPS | 100 | 0 | 45.7 | 11.3 | >80 | 10 | |
| 5 | EDGA/VPA (iPrOH/H$_2$O) | 79/21 | 6% V50 | 80 | 0 | 36.6 | n.d. | >80 | 3.2 | |
| 6 | HEA/VPA | 62/38 | 6% NaPS | 100 | 0 | 27.9 | 27.9 | 55 | 4.7 | |
| 7 | HEA/VPA | 71/29 | 6% NaPS | 100 | 0 | 30.5 | 24.2 | 59 | 0.3 | |
| 8 | HEA/VPA | 71/29 | 6% NaPS | 100 | 0 | 28.6 | 19.6 | 48 | 1 | |

TABLE 1-continued

Synthesis of inventive copolymers from the monomers in accordance with general working procedure 1:

| Polymer No. | Monomers employed and their amounts [% by weight] | Amount of Initiator[1] [% by weight] | T [°C.] | Amount of base[2] [mol %] based on VPA | Solids content after polymerization [% by weight] | K value [1% strength] | Degree of esterification [mol %][3] | Residual VPA[2] [mol %] | Remarks |
|---|---|---|---|---|---|---|---|---|---|
| 9 | HEA/VPA | 81/19 | 6% NaPS | 100 | 0 | 30.4 | 20.6 | 68 | 0 | |
| 10 | HEA/VPA | 91/9 | 6% NaPS | 100 | 0 | 28.8 | 19.8 | 75 | 0 | |
| 11 | HEA/AA/MaA/VPA | 53/23/8/16 | 6% NaPS | 100 | 22% TEA | 29.5 | 19.7 | n.d. | 1.6 | |
| 12 | HEA/MaA/VPA | 60/20/20 | 3.5% NaPS | 100 | 50% TEA | 48.9 | 19.6 | n.d. | 3.8 | |
| 13 | HEA/HPA/VPA | 35/35/30 | 3% V50 | 80 | 0 | 44.0 | 32.9 | 78 and 81 | 1.8 | |
| 14 | HEA/HPA/VPA | 50/20/30 | 3% V50 | 80 | 0 | 44.7 | 30.7 | 83 and 87 | 2.0 | |
| 15 | HEA/HPA/VPA | 20/50/30 | 3% V50 | 80 | 0 | 44.2 | 31.5 | 83 and 85 | 2.7 | |
| 16 | HEMA/VPA | 65/35 | 6% NaPS | 100 | 0 | 29 | 12.7 | 85 | 14.3 | |
| 17 | HEMA/VPA | 74/26 | 6% NaPS | 100 | 0 | 32.1 | 14.6 | 90 | 8.2 | |
| 18 | HEMA/VPA | 74/26 | 6% NaPS | 100 | 0 | 29.3 | 13 | 90 | 15.4 | |
| 19 | HEMA/VPA | 83/17 | 6% NaPS | 100 | 0 | 29.5 | 12.3 | 91 | 10.6 | |
| 20 | HEMA/VPA | 92/8 | 6% NaPS | 100 | 0 | 32.8 | 11.9 | 94 | 17.4 | |
| 21 | HEMA/AA/MaA/VPA | 53/23/8/16 | 6% NaPS | 100 | 22% TEA | 29.6 | 16.3 | n.d. | 10 | |
| 22 | HPA/VPA | 64/36 | 6% V50 | 80 | 0 | 43.7 | 32 | 85 | 1.3 | |
| 23 | HPA/VPA | 70/30 | 3% V 50 | 80 | 0 | 43.6 | 27.3 | 83 | 2.4 | $M_w$ 122 000 g/mol |
| 24 | HPA/VPA | 70/30 | 6% NaPS | 100 | 0 | 30 | 20.1 | 86 | 0.5 | $M_w$ 35 400 g/mol |
| 25 | HPA/VPA | 70/30 | 6% V 50 | 80 | 10% TEA | 44.3 | 21.9 | 96 | 1.2 | $M_w$ 32 500 g/mol |
| 26 | HPA/VPA | 70/30 | 3% V50 | 80 | 20% TEA | 30 | 28.6 | 94 | 9 | $M_w$ 46 100 g/mol |
| 27 | HPA/VPA | 70/30 | 3% V 50 | 80 | 50% TEA | 46.7 | 23.7 | 93 | 4 | $M_w$ 20 500 g/mol |
| 28 | HPA/VPA | 74/26 | 3% V50 | 80 | 0 | 34.8 | 27.2 | 72 | 2 | $M_w$ 58 000 g/mol |
| 29 | HPA/VPA | 92/8 | 3% V50 | 80 | 0 | 38.5 | 25.3 | 87 | <1 | |
| 30 | HPA/AA/VPA | 42/28/30 | 6% NaPS | 100 | 0 | 43.8 | 46.8 | 78 | 3.2 | |
| 31 | HPA/AA/VPA | 52/23/25 | 6% V50 | 80 | 0 | 44.4 | 19.8 | 85 | <1 | |
| 32 | HPA/MA/VPA | 60/10/30 | 3% V50 | 80 | 0 | 43.5 | 30.1 | 88 and 91 | 3.1 | |
| 33 | HPA/MA/VPA | 50/20/30 | 3% V 50 | 80 | 0 | 43.7 | 30.0 | 83 and 87 | 3.6 | |
| 34 | HPA/MS/VPA | 60/20/20 | 6% NaPS | 100 | 20% TEA | 48.7 | 31.4 | 81 | 3.4 | |
| 35 | HPA/MS/VPA/MBA | 68/14/16/2 | 3.5% NaPS | 100 | 43% TEA | 49.5 | 19.5 | 75 | 2.5 | |
| 36 | HPA/VPA/HDDA | 67/29/4 | 6% NaPS | 100 | 0 | 44.3 | 25 | 66 | <1 | |
| 37 | HPA/VPA/MBA | 66/29/5 | 6% NaPS | 100 | 0 | 45.7 | 27.9 | 64 | <1 | |
| 38 | HPA/VPA/PEGDA | 64/28/8 | 6% NaPS | 100 | 0 | 45.8 | 27.9 | 65 | <1 | |
| 39 | MPEG1000MA/VPA | 95/5 | 6% NaPS | 100 | — | 47.7 | n.d. | >80 | 9.9 | |
| V40 | HPA/VPA | 99/1 | 3% V 50 | 80 | 0 | 45.1 | 15.1 | 99 | <1 | |
| V41 | HPA/VPA | 96/4 | 3% V 50 | 80 | 0 | 40.5 | 22.8 | 89 | <1 | |
| V42 | HPA/HEMA-P | 70/30 | 3% V 50 | 80 | 0 | — | — | — | — | Batch gelled |
| V43 | HPA/MA/HEMA-P | 45/50/5 | 3% V 50 | 80 | 0 | — | — | — | — | Batch gelled |
| V44 | HPA/MA/HEMA-P | 49/50/1 | 3% V 50 | 80 | 0 | — | — | — | — | Batch gelled |

Explanations:
[1]Initiator amount in % by weight based on monomers,
[2]residual VPA content in mol % based on VPA employed,
[3]degree of esterification in mol % based on COOH, in the event there are two or more monomers A or alcohols, based on the respective component,
n.d.: not determined;
C = comparative example TABLE 1a Composition of product polymers: for an HPA/VPA monomer ratio of 70/30% by weight, the relation between the degree of esterification and the composition of the product polymers in % by weight is as follows:

| Degree of esterification [mol %] | Composition of reaction product [mol %] | Composition of reaction product [% by weight] |
|---|---|---|
| 95 | AA/HPA/VPA 3.3/62.7/34 | AS/HPA/VPA 2/68/30 |
| 90 | AA/HPA/VPA 6/60/34 | AS/HPA/VPA 4/66/30 |
| 80 | AA/HPA/VPA 12/54/34 | AS/HPA/VPA 7/61/32 |
| 70 | AA/HPA/VPA 18/48/34 | AS/HPA/VPA 11/56/33 |
| 60 | AA/HPA/VPA 24/43/34 | AS/HPA/VPA 16/51/33 |
| 50 | AA/HPA/VPA 30/36/34 | AA/HPA/VPA 20/45/35 |

TABLE 2

Synthesis of copolymers by polymer-analogous esterification in accordance with general working procedure 3:

| Polymer No. | Composition of polymer [% by weight] | Alcohol [mol %] based on COOH | T [° C.] | Solids content after reaction[1] | K value [1% strength] | Degree of esterification [mol %] |
|---|---|---|---|---|---|---|
| 45 | AA/VPA 61/39[1] | 100 PG | 100 | 33.5 | 29.2 | 14 |
| 46 | AA/MaA/VPA 60/20/20 (part-neutralized with 6 mol % TEA per COOH) | 100 PG | 100 | 32.8 | 16.5 | 11 |
| 47 | AA/MaA/VPA 60/20/20 (part-neutralized with 6 mol % TEA per COOH) | 100 PG | 100 | 32.6 | 16.3 | 5 |

Explanations:
[1]Including alcohol; acrylic acid-vinylphosphonic acid polymer, weight ratio 61/39, K value 28.7, solids content 42.6%

TABLE 3

Synthesis of copolymers by esterification during polymerization in accordance with general working procedure 2:

| Polymer No. | Monomers employed and amounts [% by weight] | Alcohol [mol % based on COOH] | Initiator [% by weight][1] | T [° C.] | Solids content after polymerization [% by weight][3] | K value [1% strength] | Degree of esterification [mol %] | Residual VPA[2] [mol %] | $M_w$ [g/mol] | $M_w/M_n$ |
|---|---|---|---|---|---|---|---|---|---|---|
| 48 | AA/VPA 61/39 | 100 PG | 6% $H_2O_2$ | 120 | 45 | 13 | 38 | <1 | 17 400 | 7.9 |
| 49 | AA/VPA 61/39 | 100 PG | 6% $H_2O_2$ | 100 | 40 | 13.7 | 43 | 1.5 | 15 700 | 7.9 |
| 50 | AA/VPA 61/39 | 100 PG | 6% NaPS | 100 | 35 | 30.6 | 27 | <1 | 231 000 | 57.8 |
| 51 | AA/VPA 61/39 | 100 PG | 6% $H_2O_2$ | 100 | 35 | 15.7 | 25 | 6.7 | n.d. | n.d. |
| 52 | AA/VPA 61/39 | 100 PG | 6% V50 | 80 | 28.6 | 20.4 | 26 | <1 | n.d. | n.d. |
| 53 | AA/VPA 61/39 | 100 PG | 5% $H_2O_2$ | 100 | 45 | 14.8 | 30 | <1 | 17 300 | 6.6 |
| 54 | AA/VPA 61/39 | 100 PG | 5% tBPO | 100 | 40 | 32.5 | 19 | 2.3 | n.d. | n.d. |
| 55 | AA/VPA 61/39 | 100 PG | 6% H2O2 | 100 | 45 | 23.8 | 24 | 1.8 | 29 400 | 14.7 |
| 56 | AA/VPA 61/39 | 100 PG | 6% NaPS | 100 | 45 | 27.5 | 26 | 7.4 | 414 000 | 111.9 |
| 57 | AA/VPA 73/27 | 100 PG | 5% H2O2 | 100 | 45 | 16.7 | 28 | <1 | n.d. | n.d. |
| 58 | AA/VPA 79/21 | 100 PG | 5% H2O2 | 100 | 45 | 15.2 | 28 | <1 | n.d. | n.d. |
| 59 | AA/VPA 79/21 | 100 PG | 6% H2O2 | 100 | 45 | 14.9 | 24 | <1 | n.d. | n.d. |
| 60 | AA/VPA 79/21 | 100 PG | 6% NaPS | 100 | 40 | 25.2 | 27 | 2.1 | n.d. | n.d. |
| 61 | AA/VPA 86/14 | 100 PG | 5% H2O2 | 100 | 45 | 15.1 | 33 | <1 | n.d. | n.d. |
| 62 | AA/VPA 61/39 | 200 PG | 5% H2O2 | 100 | 40 | 11.7 | 51 | <1 | 9600 | 3.8 |
| 63 | AA/VPA 61/39 | 50 PG | 5% NaPS | 100 | 40 | 41.5 | 15 | 6.2 | 482 000 | 117.6 |
| 64 | AA/VPA 61/39 | 100 DPG | 5% H2O2 | 100 | 40 | 14.4 | 11 | <1 | n.d. | n.d. |
| 65 | AA/VPA 61/39 | 100 TPG | 5% H2O2 | 100 | 35 | n.d. | 14 | 7.3 | n.d. | n.d. |
| 66 | AA/VPA 61/39 | 50 PG + 50 DMEA | 5% H2O2 | 100 | 35 | 12.9 | 14 (10 + 4) | <1 | n.d. | n.d. |
| 67 | AA/VPA 61/39 | 70 PG + 30 EG | 5% H2O2 | 100 | 45 | 20.7 | 28 (19 + 9) | <1 | 70 000 | 18.4 |
| 68 | AA/VPA 61/39 | 80 PG + 20 PI A350E | 5% H2O2 | 100 | 35 | 13.5 | 22 (20 + 2) | <1 | n.d. | n.d. |
| 69 | AA/VPA 61/39 | 80 PG + 20 PI A500E | 5% H2O2 | 100 | 32 | 13.3 | 28 (23 + 5) | <1 | n.d. | n.d. |
| 70 | AA/VPA 61/39 | 90 PG + 10 CS | 5% NaPS | 100 | 35 | 45.3 | 35 | 8 | n.d. | n.d. |
| 71 | AA/VPA 61/39 | 90 PG + 10 Glu initial charge | 5% NaPS | 100 | 30.9 | 42.2 | 22 | 14.4 | n.d. | n.d. |
| 72 | AA/VPA 61/39 | 90 PG + 10 Glu in feed stream | 5% NaPS | 100 | 35 | 41.7 | 36 | 11.7 | n.d. | n.d. |
| 73 | AA/VPA 61/39 | 95 PG + 5 Glu after polym. | 5% H2O2 | 100 | 45 | 17.5 | 18 | <1 | n.d. | n.d. |
| 74 | AA/VPA 61/39 | 95 PG + 5 Glu in initial charge | 5% NaPS | 100 | 45 | 26.8 | 29 | >10 | n.d. | n.d. |
| 75 | AA/MA/VPA 24/39/37 | 100 PG | 5% V50 | 80 | 45 | 21.5 | 25 | <1 | n.d. | n.d. |
| 76 | AA/MA/VPA 33/30/37 | 100 PG | 5% V50 | 80 | 45 | 21.5 | 27 | 1.3 | n.d. | n.d. |
| 77 | AA/MaA/VPA 60/20/20 | 100 PG | 6% NaPS | 100 | 43.5 | 12.2 | 47 | <1 | n.d | n.d. |
| 78 | AA/MaA/VPA 72/7/21 | 100 PG | 6% H2O2 | 100 | 45 | 14.5 | 27 | <1 | n.d. | n.d. |
| 79 | AA/MaA/VPA 72/7/21 | 100 PG | 6% NaPS | 100 | 40 | 28.3 | 30 | 3.3 | n.d. | n.d. |

Explanations:
[1]Amount of initiator in % by weight based on monomers,
[2]Residual VPA content in mol % based on VPA employed,
[3]Alcohol included as solvent in calculation,
n.d.: not determined TABLE 3a Composition of product polymers: for an AA/VPA monomer ratio of 61/39% by weight and 100 mol % of the alcohol component (based on COOH groups), the relation between the degree of esterification and weight composition is as follows:

| Degree of esterification [mol %] | Composition of reaction product [mol %] | Composition of reaction product [% by weight] |
|---|---|---|
| 5 | AA/HPA/VPA 67.5/3.5/30 | AA/HPA/VPA 57/5/38 |
| 10 | AA/HPA/VPA 63/7/30 | AA/HPA/VPA 52/10/37 |
| 20 | AA/HPA/VPA 56/14/30 | AA/HPA/VPA 45/20/35 |
| 30 | AA/HPA/VPA 49/21/30 | AA/HPA/VPA 37/29/34 |
| 40 | AA/HPA/VPA 42/28/30 | AA/HPA/VPA 30/37/33 |

Part B: Use of the Inventive Copolymers for Passivating

The copolymers prepared were used to conduct the following performance tests:

Formulations Employed:

Aqueous solutions of the copolymers were employed in each case. The concentration of the polymers was in each case 15-20% by weight, based on the sum of all components of the formulation. The precise amount is indicated in each case in table 4. The formulations additionally comprised, if appropriate, $Mg_3(PO_4)_2$, $Zn3(PO_4)_2H_3PO_4$ in the amounts indicated in table 4.

Additionally, for comparison purposes, a copolymer of 60% by weight acrylic acid, 20% by weight maleic acid, and 20% by weight vinylphosphonic acid was used (prepared as per WO 2006/021308).

Steel Panels Used

For the inventive and comparative examples, test panels made of hot dip galvanized steel (Gardobond® OE HDG 3, 105×190 mm) were used.

Cleaning

If indicated, the panels were immersed for 10-20 seconds in an alkaline cleaning solution (Ridoline® C72, Henkel), rinsed off immediately with fully dimineralized water, and then dried with nitrogen.

Application of a Conversion Coat

The cleaned panels were immersed for 1 s in each case at room temperature in the formulations listed in table 1, squeezed off with a system of rolls, and dried in a drying oven at 160° C. for 12 s (peak metal temperature in the course of drying did not exceed 50° C. in this operation).

Tests

The panels coated with the conversion coat were each used to conduct corrosion tests, more specifically a condensation climatic cycling test with alternation of air humidity and air temperature in accordance with DIN 50017-KFW, and a salt spray mist test (SSK) in accordance with DIN 50021-SS.

Condensation Climatic Cycling Test (KFW):

The condensation climatic cycling test (DIN 51017) is composed of one or more climatic cycles each with two test sections. In the first section the test specimens are exposed for 8 hours at a temperature of 40° C. and a relative humidity of 100%, while in the second section they are exposed at a temperature of 18-28° C. and a humidity of below 100% (ambient conditions). The duration of one cycle is therefore 24 hours.

The samples were assessed visually on the following criteria:

| 0 | no chalking |
|---|---|
| 1 | slight chalking |
| 2 | moderate chalking |
| 3 | severe chalking |
| 4 | very severe chalking |
| f: | slightly fleck texture |
| F: | distinctly pronounced fleck texture |
| WR: | white rust |
| l-, s-, m: | slightly or severely marbled |

"Chalking" denotes a white haze on the coating. As the degree of chalking increases, the coating becomes continually less transparent.

Salt Spray Test (SSK)

This spray mist test is a corrosion test standardized in DIN 50021 in which finely sprayed sodium chloride solution is caused to act on the sample. 1.5 ml of solution per hour, based on a surface area of 80 $cm^2$, is sprayed with the aid of moistened compressed air onto an inclined sample at 35° C. The solution used was a 5% strength NaCl solution. The coated samples are subjected intact to the test. The test duration is in each case 48 h.

Evaluation of the Panels after SSK:

The quality of corrosion control in the salt spray test was evaluated in accordance with DIN EN ISO 10289, by awarding evaluation numbers from 0 to 10 in accordance with predetermined standards. The evaluation number is a measure of the formation of white rust on the panel. The higher the evaluation number, the smaller the fraction of the surface area corroded and the better the corrosion control. The evaluation numbers are awarded in accordance with the following table:

| Defect surface area % | Evaluation grade $R_p$ or $R_A$ |
|---|---|
| no defect | 10 |
| 0 < A ≤ 0.1 | 9 |
| 0.1 < A ≤ 0.25 | 8 |
| 0.25 < A ≤ 0.5 | 7 |
| 0.5 < A ≤ 1.0 | 6 |
| 1.0 < A ≤ 2.5 | 5 |
| 2.5 < A ≤ 5.0 | 4 |
| 5.0 < A ≤ 10 | 3 |
| 10 < A ≤ 25 | 2 |
| 25 < A ≤ 50 | 1 |
| 50 < A | 0 |

All details of the formulations used, and the results of the tests, are compiled in table 4.

Test on an Industrial Strip Galvanizing Line

The experimental series was carried out on an industrial strip galvanizing line. The substrate used was a steel strip which had first been provided in a hot dip station with a zinc add-on of 275 g/$m^2$. Thereafter the formulations were applied to the strip using a spraying bar system, with a strip speed of 70-80 m/min, and were removed by squeegeeing with a system of rolls, and dried (peak metal temperature <50° C.).

The formulations used were as described above. The precise experimental parameters are summarized in table 5. 6-12 test sections were cut from each of the coated strips and subjected to testing as described above. The average values of the results are summarized in table 5.

TABLE 4

Performance testing of copolymers:

| Ex. No. | Polymer No. | Composition[1] | [% by weight] | Conc. | Additions [% by weight based on polymer] Mg$_3$(PO$_4$)$_2$ | Zn$_3$(PO$_4$)$_2$ | H$_3$PO$_4$ | pH | Visual assessment KFW test | RI 48 h SSK | Remarks |
|---|---|---|---|---|---|---|---|---|---|---|---|
| C1 | — | AA/MaA/VPA | 60/20/20 | 15% | 4.5 | — | 3.4 | 1.1 | 4 | 10 | Copolymer without monomers (A) |
| C2 | — | HPA | 100 | 20% | 4.5 | — | 3.4 | 3.7 | WR | 0 | Homopolymer of hydroxypropyl acrylate |
| C3 | C 40 | HPA/AA/VPA | 98/1/1 | 20% | 4.5 | — | 3.4 | 2.4 | WR | 0 | Low VPA content |
| C4 | C 41 | HPA/AA/VPA | 90/6/4 | 20% | 4.5 | — | 3.4 | 1.5 | WR | 0 | Low VPA content |
| 1 | 7 | HEA/AA/VPA | 47/21//32 | 15% | — | — | — | 1 | 0-0.5 | 6 | |
| 2 | 7 | HEA/AA/VPA | 47/21/32 | 20% | — | — | — | 1 | 0-0.5 | 9.5 | |
| 3 | 10 | HEA/AA/VPA | 75/15/10 | 15% | | 10 | | 2.5 | 1 | 5 | |
| 4 | 9 | HEA/AA/VPA | 61/18/21 | 15% | | 10 | | 2.5 | 1 | 8.5 | |
| 5 | 6 | HEA/AA/VPA | 38/19/43 | 15% | | 10 | | 2.5 | 1 | 10 | |
| 6 | 23 | HPA/AA/VPA | 61/7/32 | 15% | 4.5 | — | 3.4 | 1 | 0 | 9.5 | |
| 7 | 24 | HPA/AA/VPA | 63/6/31 | 15% | 4.5 | — | 3.4 | 1 | 1 | 9 | |
| 8 | 25 | HPA/AA/VPA | 68/2/30 | 20% | 4.5 | — | 3.4 | 1.6 | 0.5f | 9 | Degree of neutralization of polymer 10 mol % |
| 9 | 26 | HPA/AA/VPA | 67/2/31 | 20% | 4.5 | — | 3.4 | 2 | 0 | 7.5 | Degree of neutralization of polymer 20 mol % |
| 10 | 73 | HPA/AA/VPA | 18/46/36 | 20% | 4.5 | — | 3.4 | 0.5 | 1.5 | 10 | 5% Glucose added during polymerization |
| 11 | 66 | HPA/DMAEA/AA/VPA | 10/5/49/36 | 20% | 4.5 | — | 3.4 | 2.1 | 1.5 | 10 | |
| 12 | 45 | HPA/AA/VPA | 14/48/36 | 20% | — | 2.7 | 3.4 | 1 | 2 | 9 | Polymer-analogous esterification |
| 13 | 48 | HPA/AA/VPA | 36/31/33 | 15% | — | 10 | 3.4 | 1 | 0 | 10 | Esterification during polymerization |

Notes:
[1] In this table the actual composition of the polymers is reported. It was measured immediately after the synthesis, taking into account the degrees of esterification determined experimentally in tables 1, 2 and 3.

TABLE 5

Application of copolymers following hot dip galvanizing on an industrial strip galvanizing line

| Ex. No. | Polymer No. | Composition[1] | [% by weight] | Conc | Mg$_3$(PO$_4$)$_2$ | H$_3$PO$_4$ | HNO$_3$ | CH$_3$SO$_3$H |
|---|---|---|---|---|---|---|---|---|
| 14 | 7 | HEA/AA/VPA | 47/21/32 | 21 | 4.5 | 3.4 | — | — |
| 15 | 7 | HEA/AA/VPA | 47/21/32 | 21 | 4.5 | 3.4 | — | 15 |
| 16 | 7 | HEA/AA/VPA | 47/21/32 | 21 | 4.5 | 3.4 | — | — |
| 17 | 7 | HEA/AA/VPA | 47/21/32 | 21 | 4.5 | 3.4 | — | — |
| 18 | 7 | HEA/AA/VPA | 47/21/32 | 21 | 4.5 | 3.4 | 14 | — |
| 19 | 7 | HEA/AA/VPA | 47/21/32 | 21 | 4.5 | 3.4 | 18 | — |
| 20 | 7 | HEA/AA/VPA | 47/21/32 | 20.5 | 4.5 | 3.4 | 22 | — |
| 21 | 28 | HPA/AA/VPA | 59/12/29 | 21 | 4.5 | 3.4 | — | — |
| 22 | 28 | HPA/AA/VPA | 59/12/29 | 21 | 4.5 | 3.4 | — | — |
| 23 | 28 | HPA/AA/VPA | 59/12/29 | 21 | 4.5 | 3.4 | 12 | — |
| C5 | — | AA/MaA/VPA | 60/20/20 | 19 | 4.5 | 3.4 | 15 | — |
| C6 | — | AA/MaA/VPA | 60/20/20 | 19 | 4.5 | 3.4 | 22.5 | — |
| C7 | — | AA/MaA/VPA | 60/20/20 | 19 | 4.5 | 3.4 | 30 | — |
| C8 | — | AA/MaA/VPA | 60/20/20 | 19 | 4.5 | 3.4 | — | — |

| Ex. No. | Al acetate | Al nitrate | NH$_4$F | pH | Visual assessment KFW test | RI 48 h SSK | Remarks |
|---|---|---|---|---|---|---|---|
| 14 | — | — | — | <2 | 0-0.5 | 9.5 | |
| 15 | 0.18 | — | — | <2 | 0 | 6-6.5 | |
| 16 | — | 0.36 | — | <2 | 0m | 6-6.5 | |
| 17 | — | 0.54 | — | <2 | 0m | 7 | |
| 18 | — | — | — | <2 | 0m | 9 | |
| 19 | — | — | — | <2 | 0m | 8-8.5 | |
| 20 | — | — | — | <2 | 0smf | 7 | |
| 21 | — | — | 1 | <2 | 1-f | 8 | |
| 22 | — | — | 3 | <2 | 1lm | 8 | |

TABLE 5-continued

Application of copolymers following hot dip galvanizing on an industrial strip galvanizing line

| | | | | | | |
|---|---|---|---|---|---|---|
| 23 | — | — | 3 | <2 | 1.5 lm | 9.5-10 | |
| C5 | — | — | — | <2 | 4sm | 9.5-10 | Polymer without monomers(A) |
| C6 | — | — | — | <2 | 3-3.5 smf | 9 | Polymer without monomers (A) |
| C7 | — | — | — | <2 | 3smf | 9-9.5 | Polymer without monomers (A) |
| C8 | — | — | 3 | <2 | 4 | 10 | Polymer without monomers (A) |

The inventive and comparative examples show that through the use of the inventive copolymers with the monomers (A) in combination with monomers (B) and (C) the visual qualities of the passivating layers obtained can be improved considerably as compared to those of polymers which do not comprise the functional monomers (A). Polymers composed only of the monomers (A) neither exhibit an adequate corrosion control effect nor allow layers of sufficient visual quality to be achieved. At least 5% of phosphorus-containing monomers (B) are needed.

The invention claimed is:

1. An acidic preparation for passivating metallic surfaces with a pH of less than or equal to 5, comprising water and 0.1 to 50% by weight, based on the amount of all components of said acidic preparation, of at least one water-soluble or water-dispersible copolymer comprising phosphoric and/or phosphonic acid groups, wherein aqueous dispersions of crosslinking polymer particles of water-insoluble polymers are excluded, and wherein said at least one water-soluble or water-dispersible copolymer consists of the following monomeric units:
 (A) 5 to 80% by weight of at least one mono(meth)acrylic ester of formula $H_2C=CHR^1-COOR^2$, wherein $R^1$ is H or methyl and $R^2$ is a radical selected from the group consisting of:
  ($R^{2a}$) radicals of formula $-(R^3-O-)_n-R^4$, wherein n is an integer from 2 to 40, $R^3$ is, independently on each occurrence, a divalent, linear, or branched alkyl radical having from 2 to 4 C atoms, and $R^4$ is H or a linear or branched alkyl radical having from 1 to 6 C atoms;
  ($R^{2b}$) radicals of formula $-R^5-X_m$, wherein $R^5$ is an (m+1)-valent, linear or branched alkyl radical having from 1 to 10 C atoms, X is a functional group selected from the group consisting of $-OH$, $-OR^6$, $-NH_2$, $-NHR^6$, $-NR_2^6$, $-N^+HR_2Y^-$, and $-N^+R_3Y^-$, wherein $R^6$ is methyl or ethyl and Y is a monovalent anion, and m is an integer from 1 to 6, with the proviso that there is not more than one functional group X per C atom in $R^5$; and
  ($R^{2c}$) a mono- or oligosaccharide radical;
 (B) 10 to 75% by weight of at least one monoethylenically unsaturated monomer which comprises phosphoric and/or phosphonic acid groups and/or salts and/or esters thereof;
 (C) 5 to 70% by weight of at least one monoethylenically unsaturated monomer which comprises at least one COOH group and/or salts thereof; and
 (D) 0 to 30% by weight of further ethylenically unsaturated monomers differing from (A), (B), and (C).

2. The acidic preparation of claim 1, wherein $R^2$ is selected from the group consisting of $-CH_2-CH_2-OH$, $-CH_2-CH_2-CH_2-OH$, $-CH_2-CH_2-CH_2-CH_2-OH$, $-CH_2-CH(OH)-CH_3$, $-CH(CH_3)-CH_2-OH$, and $-CH_2-CH(OH)-CH_2-OH$.

3. The acidic preparation of claim 1, wherein (B) is vinylphosphonic acid.

4. The acidic preparation of claim 1, wherein (C) is (meth) acrylic acid.

5. The acidic preparation of claim 1, wherein said acidic preparation further comprises at least one dispersed wax.

6. The acidic preparation of claim 1, wherein said acidic preparation further comprises at least one metal ion selected from the group consisting of $Zn^{2+}$, $Ca^{2+}$, $Mg^{2+}$, and $Al^{3+}$.

7. The acidic preparation of claim 1, wherein said acidic preparation further comprises at least one acid selected from the group consisting of $H_3PO_4$, $HNO_3$, and methanesulfonic acid.

8. A process for passivating metallic surfaces comprising Zn, Mg, Al, Sn, Fe, Ni, or alloys comprising treating said metallic surface with the acidic preparation of claim 1.

9. The process of claim 8, wherein said metallic surface is the surface of a strip metal of electrogalvanized or hot dip galvanized steel and said treatment is carried out continuously.

10. The process of claim 8, wherein said process is a chromium-free process.

11. The process of claim 8, wherein a passivation layer is obtained which has a thickness in the range of from 0.01 to 3 µm.

12. A water-soluble or water-dispersible copolymer comprising phosphoric and/or phosphonic acid groups, wherein crosslinking polymer particles of water-insoluble polymers are excluded, and wherein said water-soluble or water-dispersible copolymer consists of the following monomeric units:
 (A) 5 to 80% by weight of at least one mono(meth)acrylic ester of formula $H_2C=CHR^1-COOR^2$, wherein $R^1$ is H or methyl and $R^2$ is a radical selected from the group consisting of:
  ($R^{2a}$) radicals of formula $-(R^3-O-)_n-R^4$, wherein n is an integer from 2 to 40, $R^3$ is, independently on each occurrence, a divalent, linear, or branched alkyl radical having from 2 to 4 C atoms, and $R^4$ is H or a linear or branched alkyl radical having from 1 to 6 C atoms;
  ($R^{2b}$) radicals of formula $-R^5-X_m$, wherein $R^5$ is an (m+1)-valent, linear or branched alkyl radical having from 1 to 10 C atoms, X is a functional group selected from the group consisting of $-OH$, $-OR^6$, $-NH_2$, $-NHR^6$, $-NR_2^6$, $-N^+HR_2Y^{31}$, and $-N^+R_3Y^{31}$, $R^6$ is methyl or ethyl, Y is a monovalent anion, and m is an integer from 1 to 6, with the proviso that there is not more than one functional group X per C atom in $R^5$; and
  ($R^{2b}$) a mono- or oligosaccharide radical;
 (B) 10 to 75% by weight of at least one monoethylenically unsaturated monomer which comprises phosphoric and/or phosphonic acid groups and/or salts and/or esters thereof;

(C) 5 to 70% by weight of at least one monoethylenically unsaturated monomer which comprises at least one COOH group and/or salts thereof; and (D) 0 to 30% by weight of further ethylenically unsaturated monomers differing from (A), (B), and (C).

13. The copolymer of claim 12, wherein $R^2$ is selected from the group consisting of —$CH_2$—$CH_2$—OH, —$CH_2$—$CH_2$—$CH_2$—OH, —$CH_2$—$CH_2$—$CH_2$—$CH_2$—OH, —$CH_2$—CH(OH)—$CH_3$, —CH($CH_3$)—$CH_2$—OH, and —$CH_2$—CH(OH)—$CH_2$—OH.

14. The copolymer of claim 12, wherein (B) is vinylphosphonic acid.

15. The copolymer of claim 12, wherein (C) is (meth)acrylic acid.

* * * * *